United States Patent
Shin et al.

(10) Patent No.: US 11,115,965 B2
(45) Date of Patent: Sep. 7, 2021

(54) METHOD AND APPARATUS FOR TRANSMITTING AND RECEIVING DATA USING NON-ORTHOGONAL MULTIPLE ACCESS IN WIRELESS COMMUNICATION SYSTEM

(71) Applicant: LG Electronics Inc., Seoul (KR)

(72) Inventors: Seokmin Shin, Seoul (KR); Hyungtae Kim, Seoul (KR); Kijun Kim, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/096,477

(22) PCT Filed: Dec. 20, 2016

(86) PCT No.: PCT/KR2016/014929
§ 371 (c)(1),
(2) Date: Oct. 25, 2018

(87) PCT Pub. No.: WO2017/188548
PCT Pub. Date: Nov. 2, 2017

(65) Prior Publication Data
US 2020/0389870 A1 Dec. 10, 2020

Related U.S. Application Data

(60) Provisional application No. 62/327,417, filed on Apr. 25, 2016.

(51) Int. Cl.
*H04W 4/00* (2018.01)
*H04W 72/04* (2009.01)
(Continued)

(52) U.S. Cl.
CPC ........ *H04W 72/042* (2013.01); *H04W 48/08* (2013.01); *H04W 72/1289* (2013.01)

(58) Field of Classification Search
None
See application file for complete search history.

(56) References Cited

U.S. PATENT DOCUMENTS 9,839,018 B2 * 12/2017 Berggren ............... H04L 5/0044
10,356,771 B2 * 7/2019 Lim ....................... H04L 5/003
(Continued)

OTHER PUBLICATIONS

LG Electronics, 'Signaling schemes for MUST assistance information', R1-162494, 3GPP TSG RAN WG1 Meeting #84bis, Busan, Korea, Apr. 2, 2016.
(Continued)

*Primary Examiner* — Clemence S Han
(74) *Attorney, Agent, or Firm* — Fish & Richardson P.C.

(57) ABSTRACT

A method for transmitting and receiving data using a non-orthogonal multiple access (NOMA) in a wireless communication system, the method performed by a first user equipment (UE) includes receiving first downlink control information (DCI) including information related to physical downlink shared channel (PDSCH) scheduling of the first UE from a base station, receiving second DCI including information related to PDSCH cancellation of a second UE from the base station, receiving a superposition signal from the base station through a specific resource, and decoding the PDSCH of the first UE by cancelling the PDSCH of the second UE from the superposition signal based on the received second DCI.

15 Claims, 12 Drawing Sheets

(51) Int. Cl.
H04W 48/08 (2009.01)
H04W 72/12 (2009.01)

(56) References Cited

U.S. PATENT DOCUMENTS

| | | |
|---|---|---|
| 2015/0351081 A1 | 12/2015 | Zhu |
| 2016/0309542 A1* | 10/2016 | Kowalski ............ H03M 13/353 |
| 2016/0374060 A1* | 12/2016 | Lim .................... H04W 72/042 |
| 2017/0041906 A1* | 2/2017 | Tsai ...................... H04L 1/0009 |
| 2018/0077687 A1* | 3/2018 | Yoshimura .............. H04L 27/38 |
| 2018/0124708 A1* | 5/2018 | Davydov ............ H04W 72/042 |
| 2018/0160401 A1* | 6/2018 | Goto ........................ H04L 5/04 |

OTHER PUBLICATIONS

Sony, 'Consideration of Efficient Control Signaling for MUST', R1-162562, 3GPP TSG RAN WG1 #84bis, Busan, Korea, Apr. 1, 2016.
QUALCOMM Incorporated, 'Mechanisms for efficient operation for MUST', R1-163046, 3GPP TSG RAN WG1 #84b, Busan, Korea, Apr. 2, 2016.
3GPP TR 36.859 v13.0.0, '3GPP; TSGRAN; Study on Downlink Multiuser Superposition Transmission (MUST) for LTE (Release 13)' Jan. 8, 2016.
SEQUANS Communications, 'configuration of superposition scheme', R1-162881, 3GPP TSG-RAN WG1 #84bis, Busan, Korea, Apr. 1, 2016.
Translation of International Search Report and Written Opinion in International Application No. PCT/KR2016/014929, dated Mar. 27, 2017, 11 pages.

\* cited by examiner

[FIG. 1]
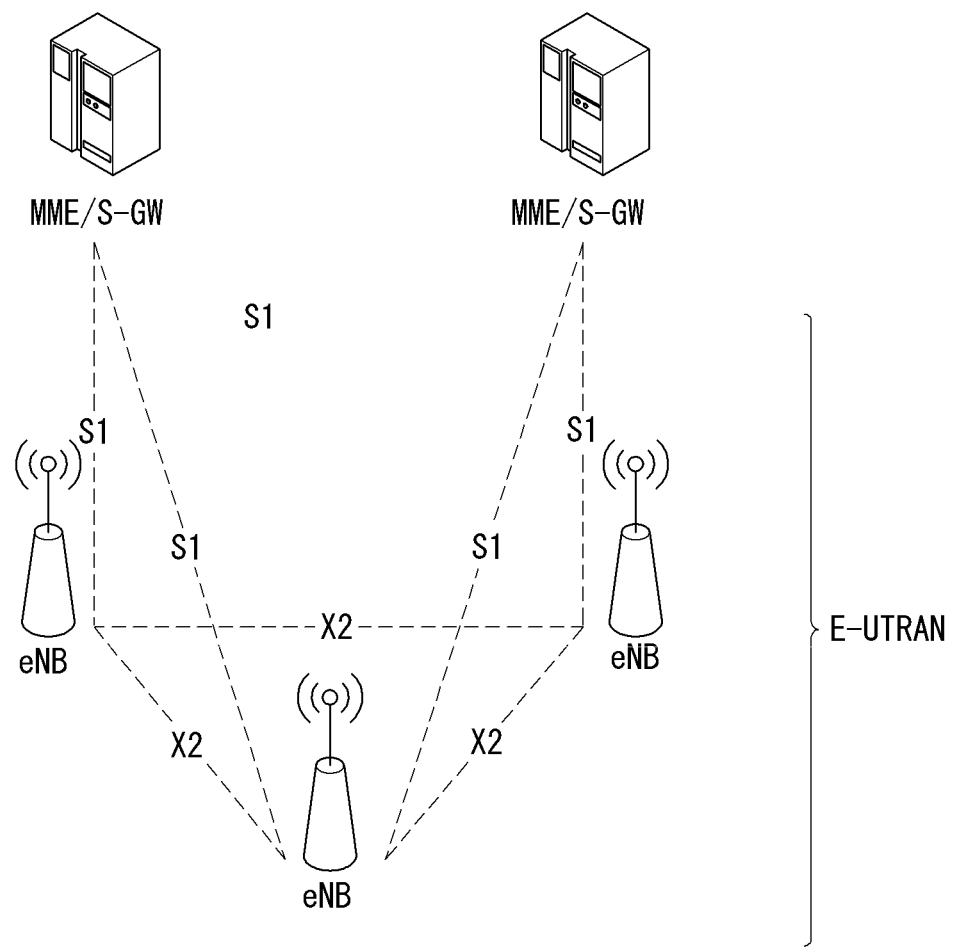

[FIG. 2]
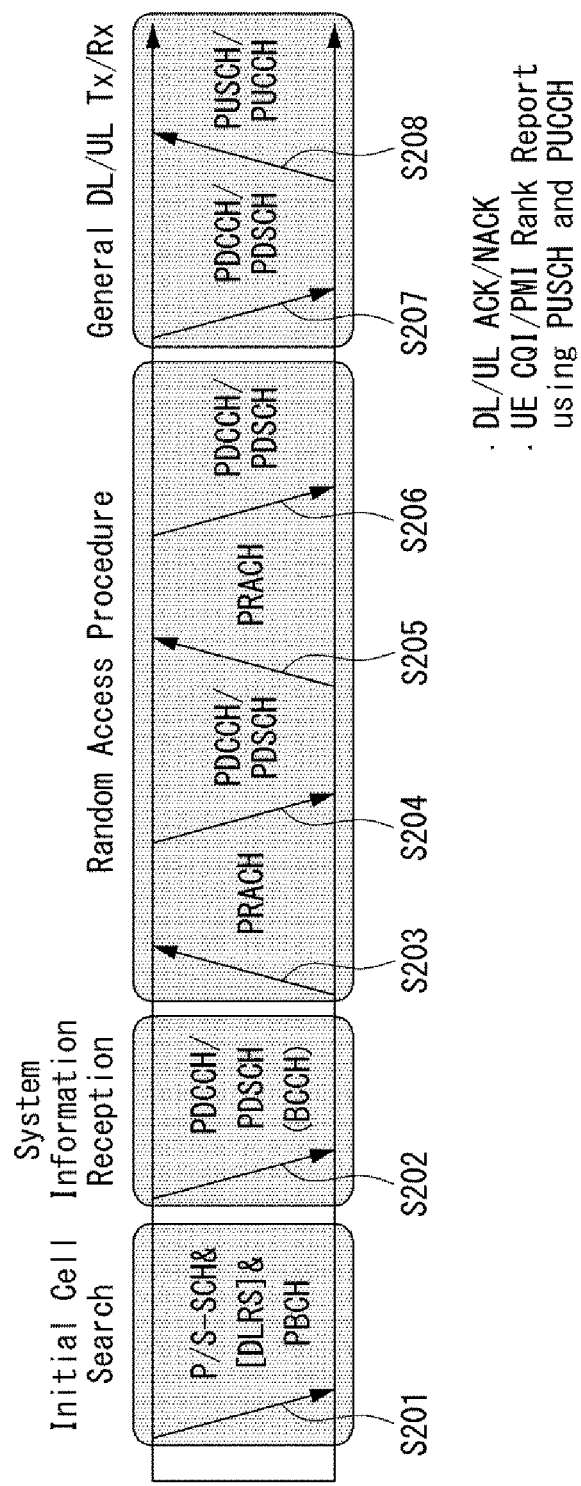

[FIG. 3]
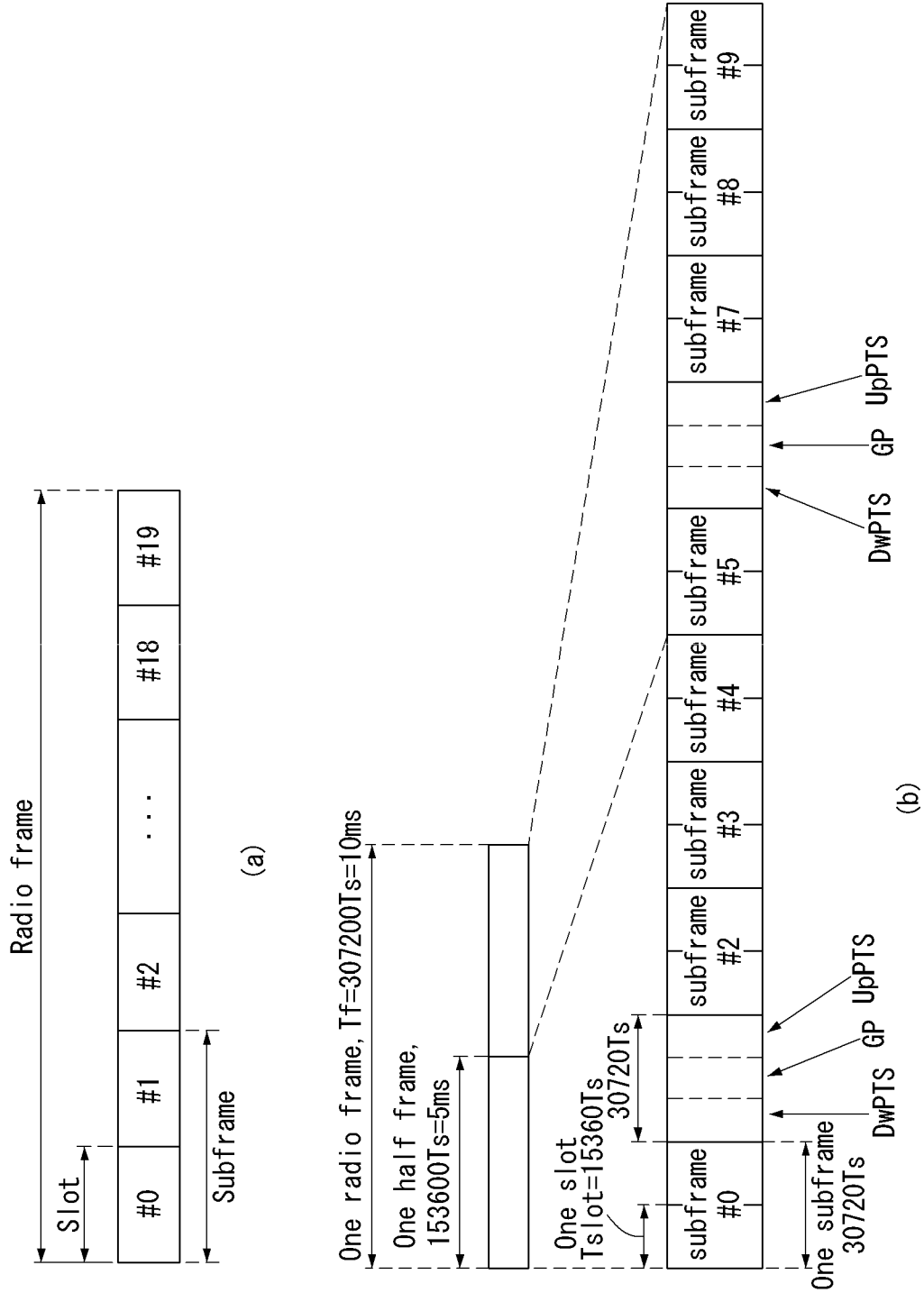

[FIG. 4]
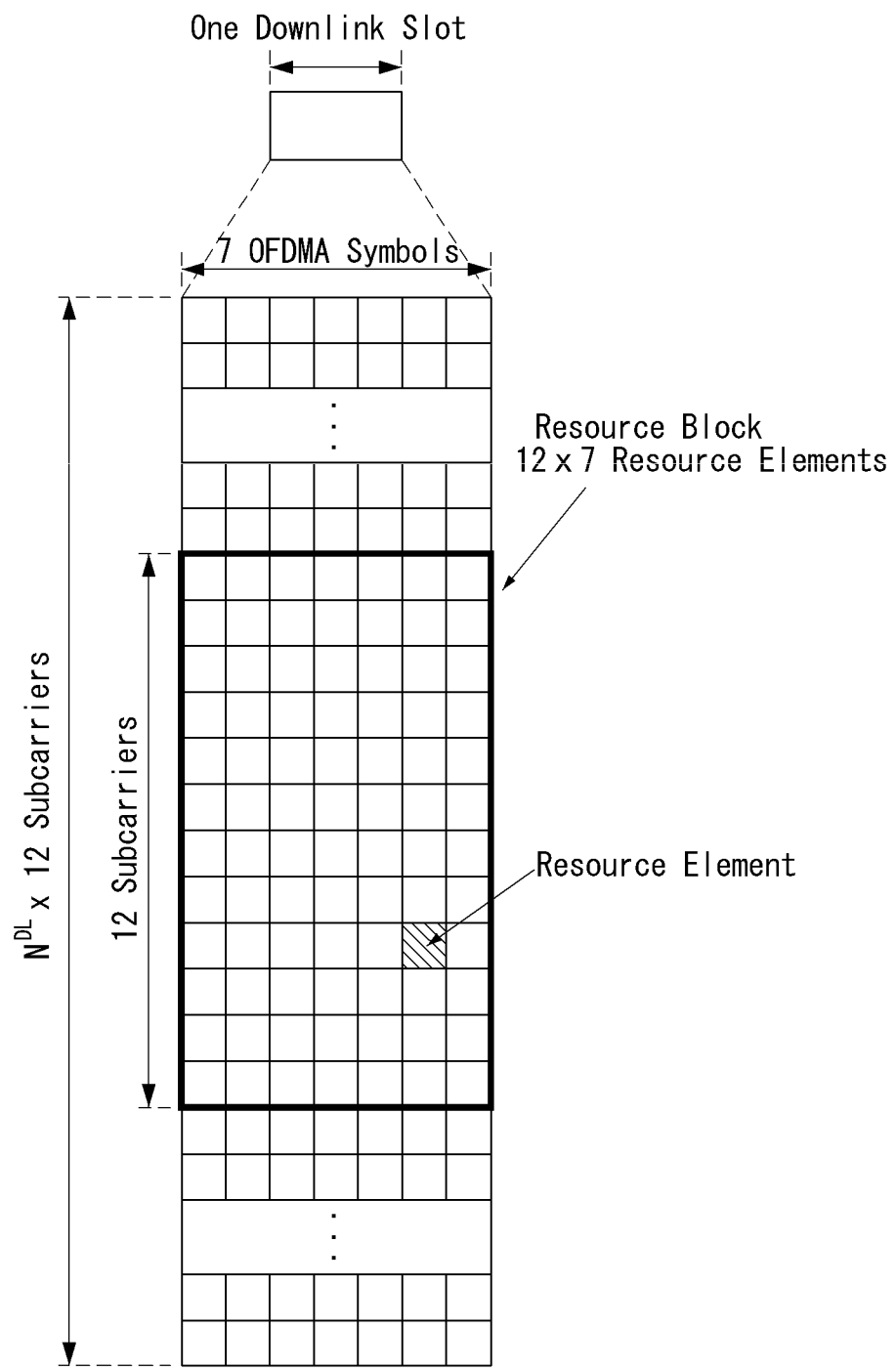

[FIG. 5]
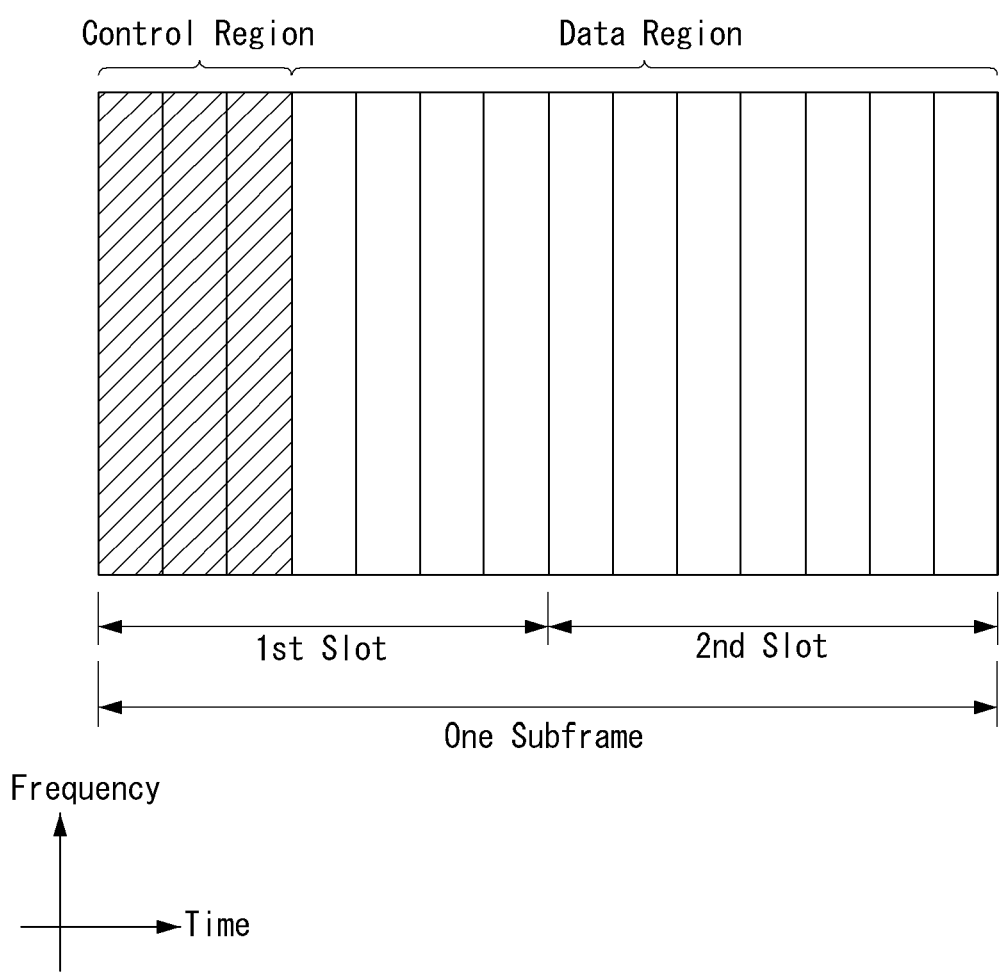

[FIG. 6]
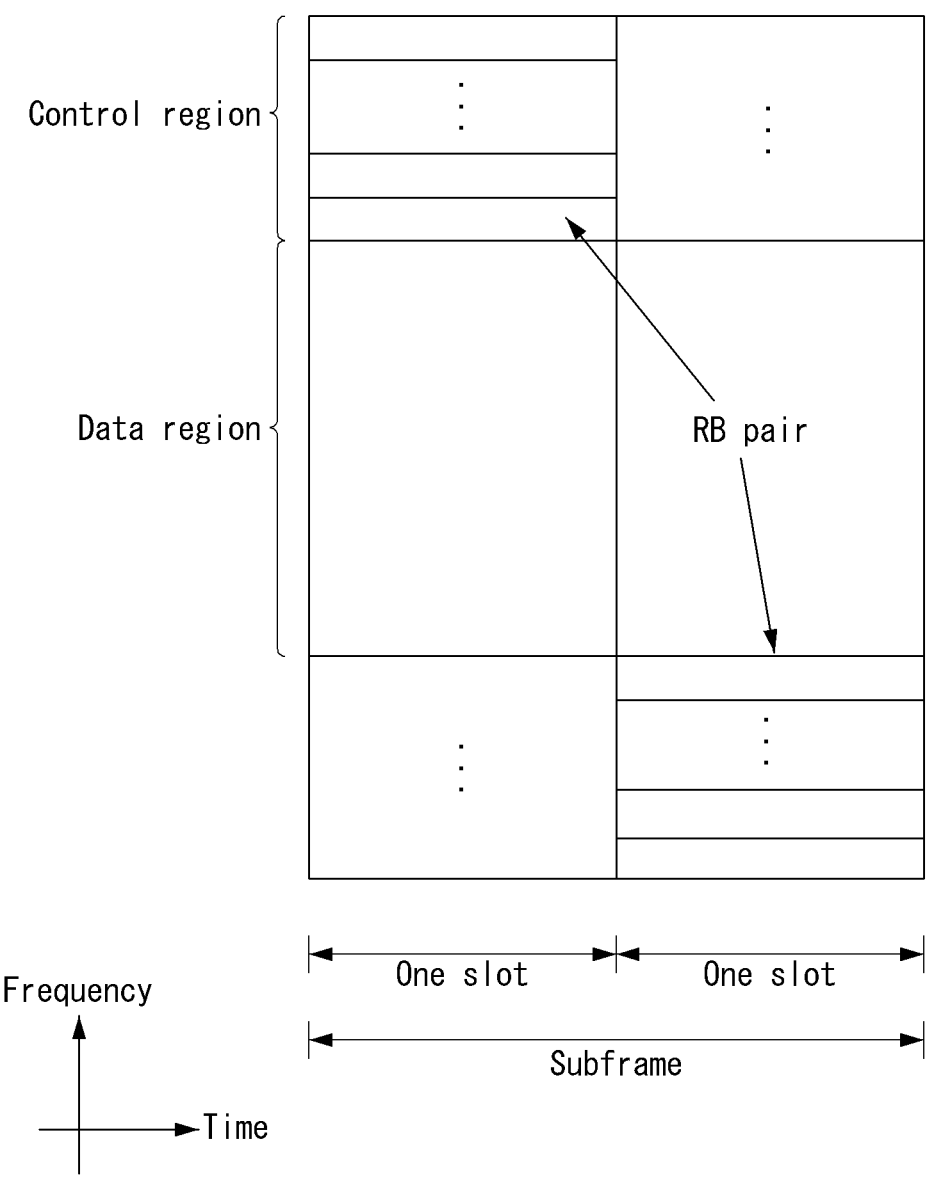

[FIG. 7]
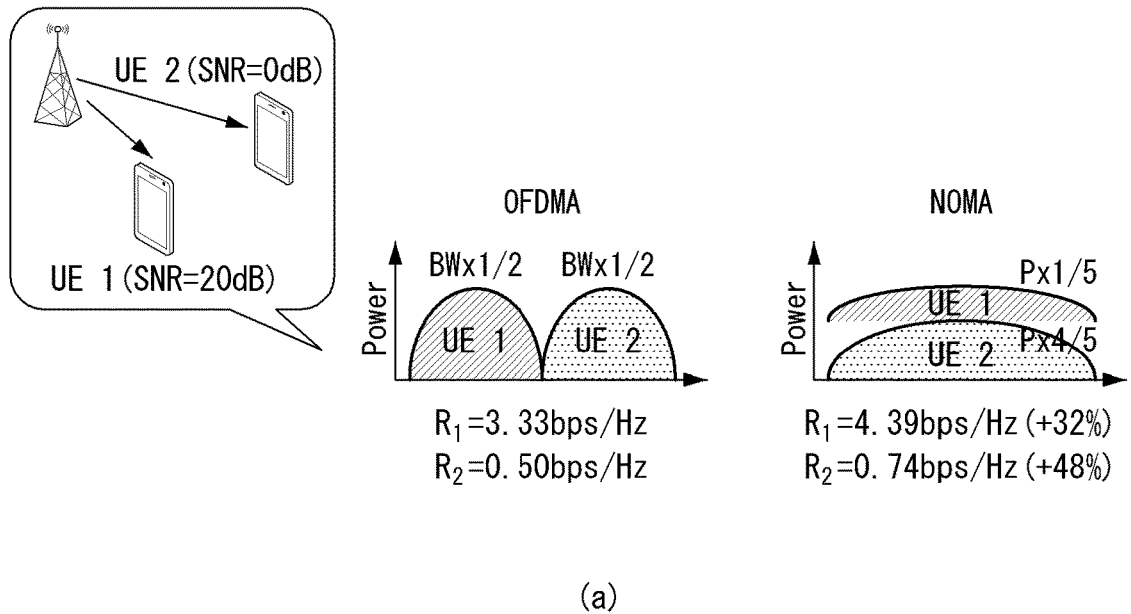
(a)
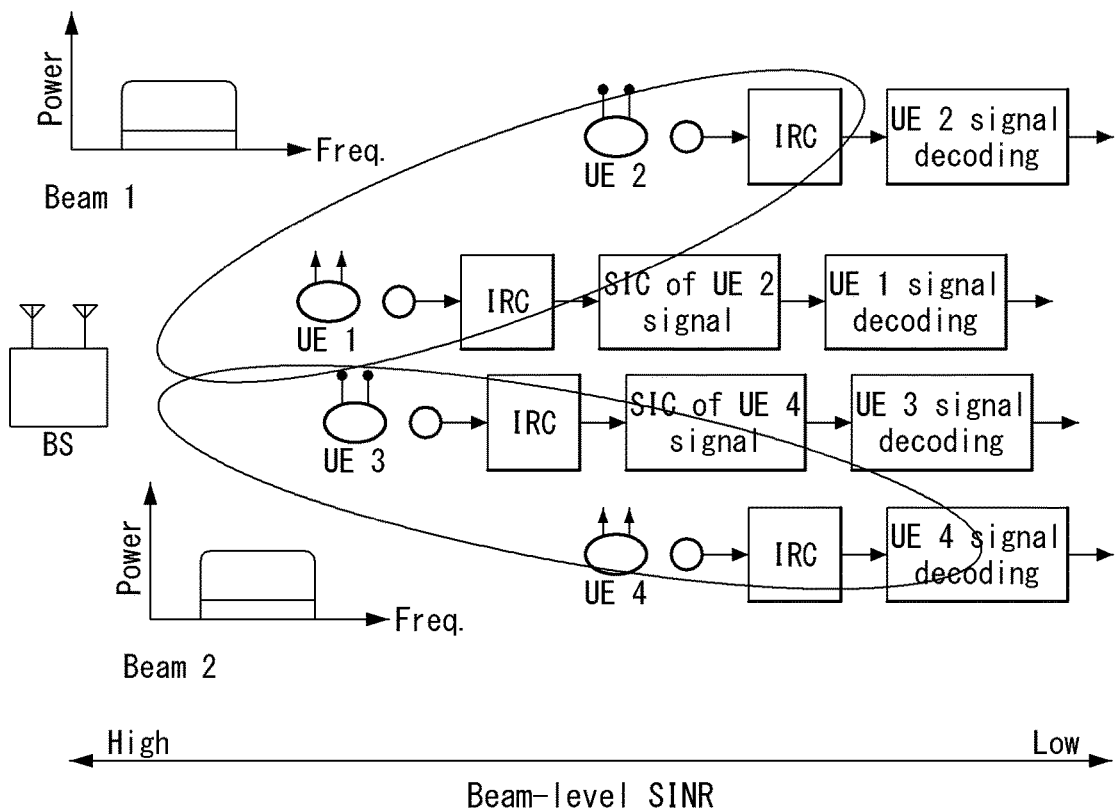
(b)

[FIG. 8]
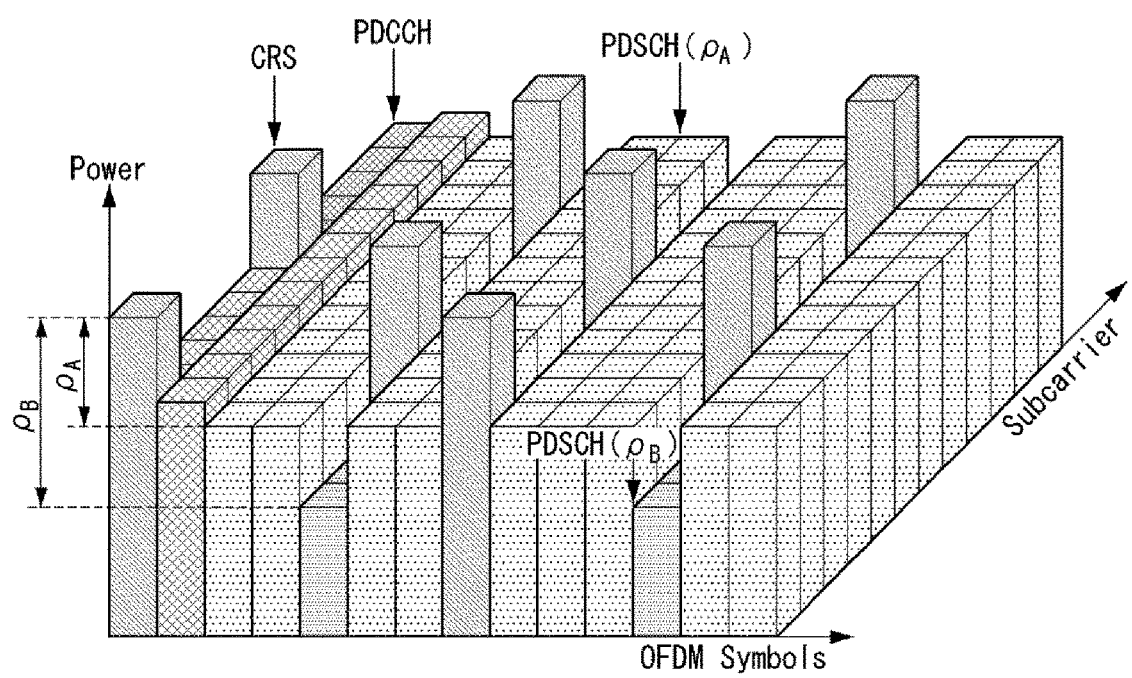

[FIG. 9]
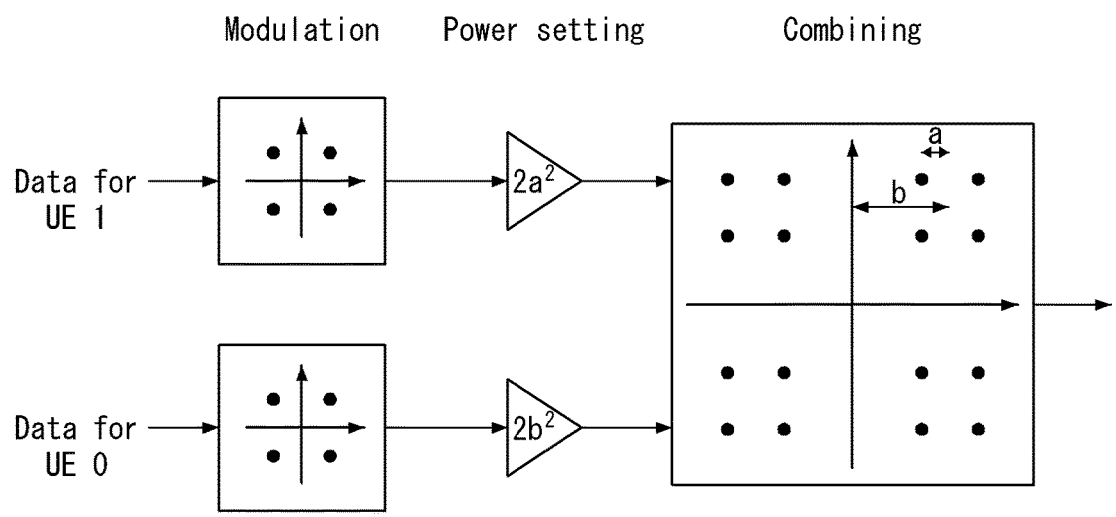
[FIG. 10]
| 0/1A | FH | Resource block assignment | MCS/RV (5) | NDI | TPC (2) | DMRS CS (3) | UI (2) | DAI (2) | CQI req. |
|---|---|---|---|---|---|---|---|---|---|

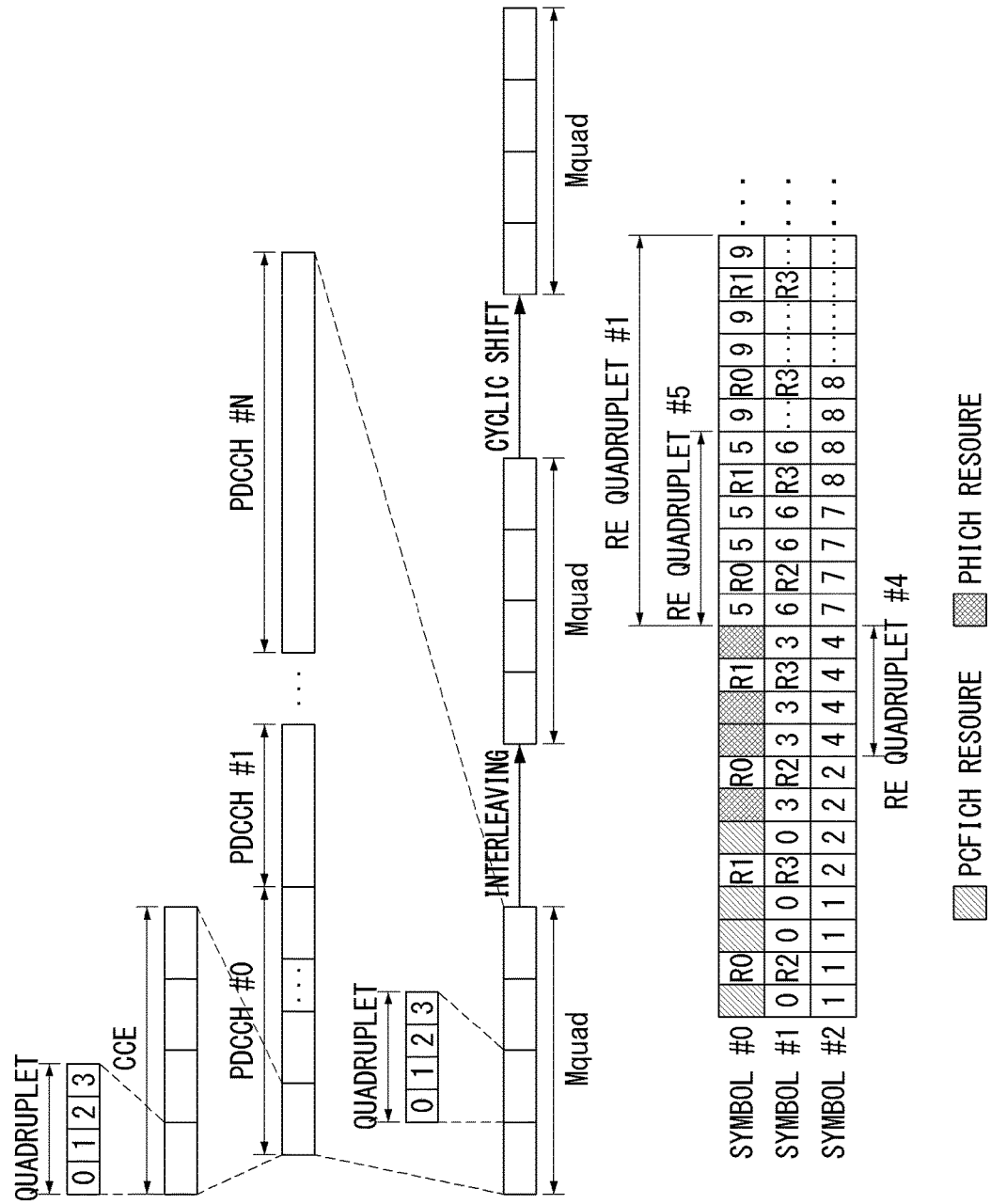
[FIG. 11]

[FIG. 12]
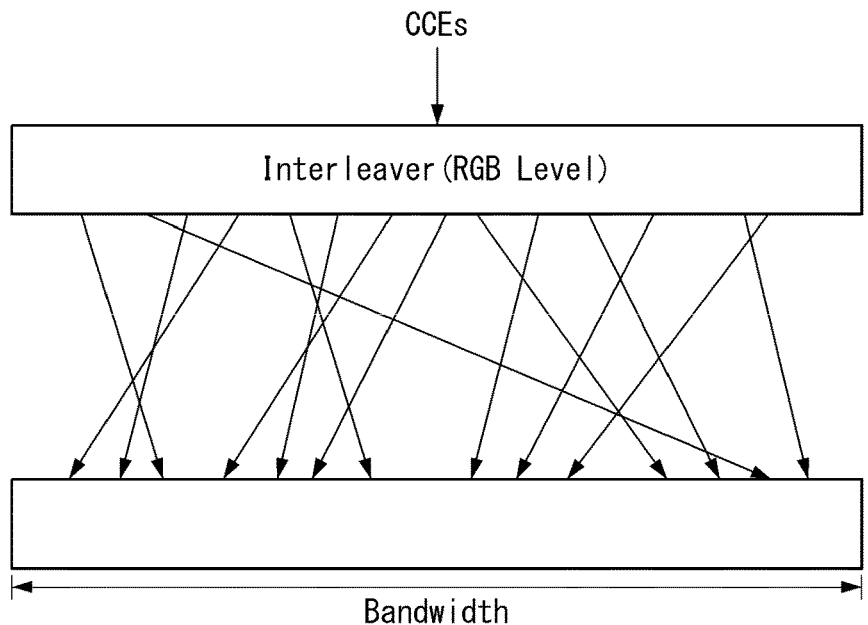
[FIG. 13]
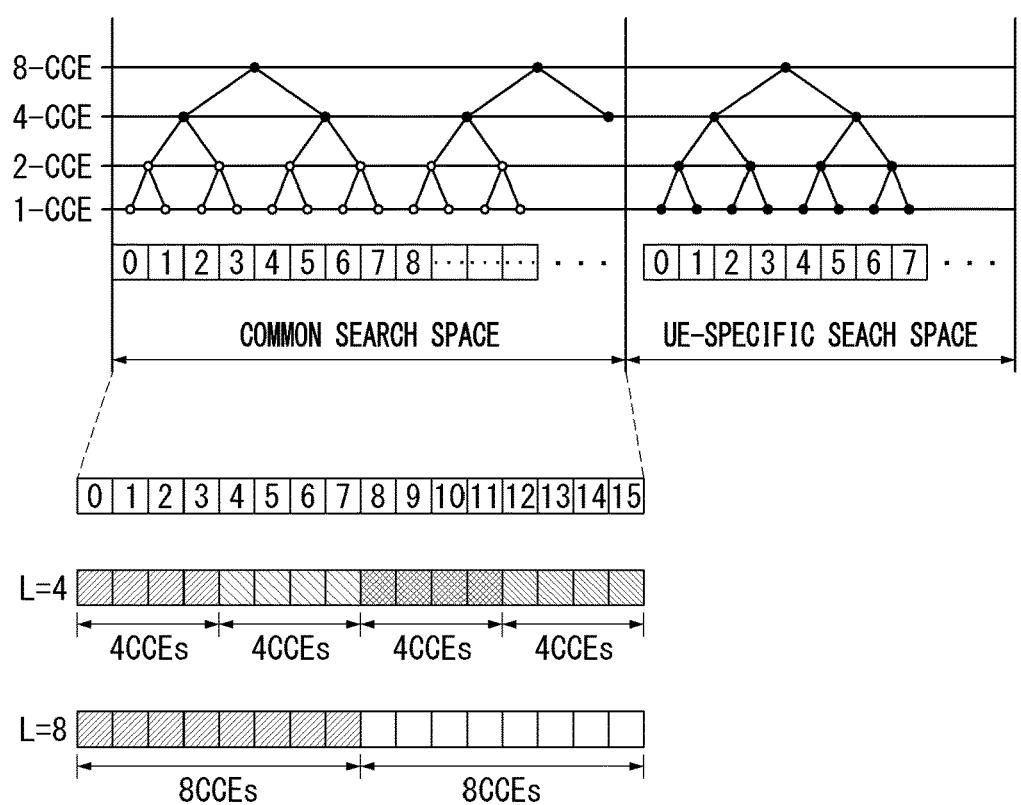

[FIG. 14]
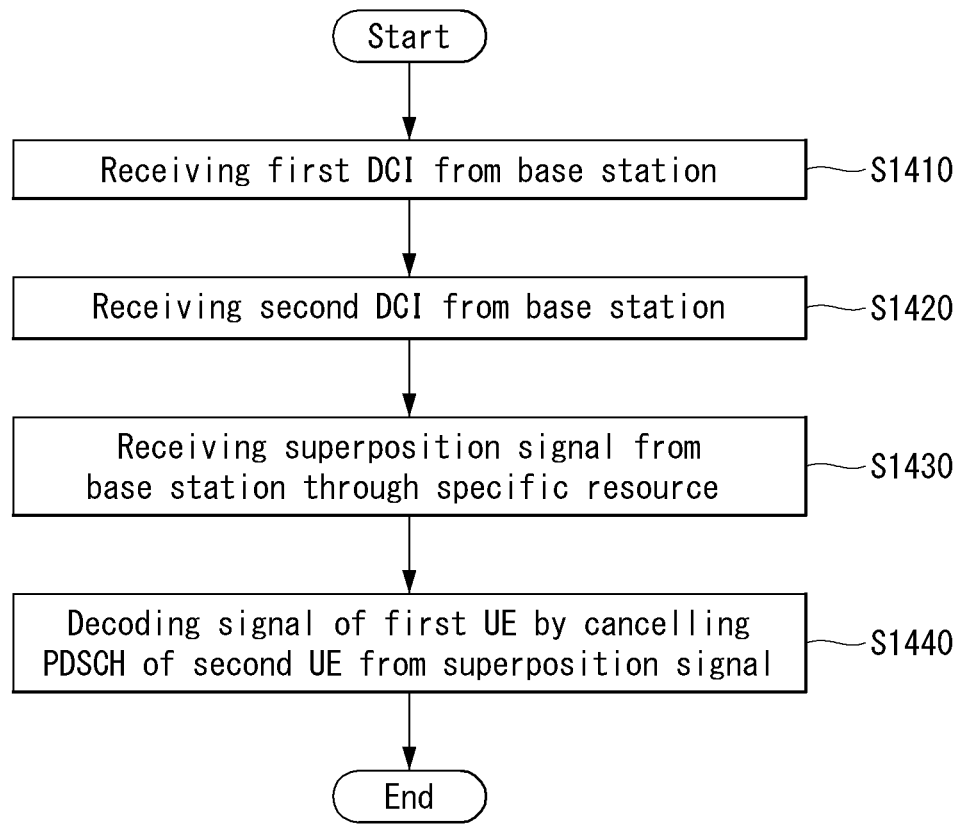
[FIG. 15]
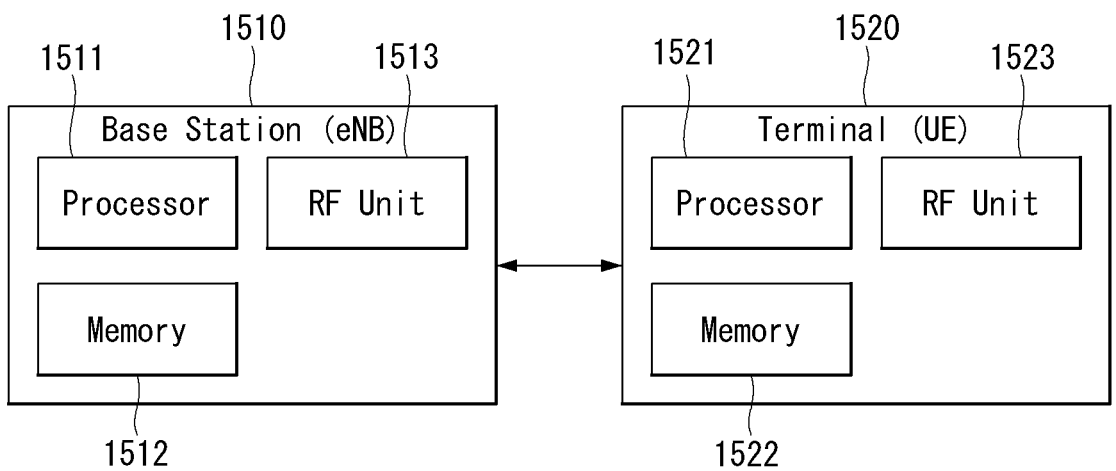

METHOD AND APPARATUS FOR TRANSMITTING AND RECEIVING DATA USING NON-ORTHOGONAL MULTIPLE ACCESS IN WIRELESS COMMUNICATION SYSTEM

CROSS-REFERENCE TO RELATED APPLICATIONS

This application is a National Stage application under 35 U.S.C. § 371 of International Application No. PCT/KR2016/014929, filed on Dec. 20, 2016, which claims the benefit of U.S. Provisional Application No. 62/327,417, filed on Apr. 25, 2016. The disclosures of the prior applications are incorporated by reference in their entirety.

TECHNICAL FIELD

The present invention relates to a wireless communication system, and more particularly, to a method for transmitting and receiving data using a non-orthogonal multiple access (NOMA) and an apparatus for supporting the same.

BACKGROUND ART

Mobile communication systems have been developed to provide voice services, while guaranteeing user activity. Service coverage of mobile communication systems, however, has extended even to data services, as well as voice services. Today, an explosive increase in traffic has resulted in the shortage of resources, and there is a need for an advanced mobile communication system because users require a high speed service.

The requirements of a next-generation mobile communication system may include supporting accommodation of huge data traffic, a remarkable increase in the transfer rate of each user, accommodation of a significantly increased number of connection devices, very low end-to-end latency, and high energy efficiency. To this end, various techniques, such as dual connectivity, massive multiple input multiple output (MIMO), in-band full duplex, non-orthogonal multiple access (NOMA), supporting super-wide band, and device networking, have been researched.

DISCLOSURE

Technical Problem

An object of the present disclosure is to provide a method for defining new DCI for transmitting information related to signal cancellation of a far user equipment (UE) in a multi-user superposition transmission (MUST) environment and distinguishing the new DCI from other DCIs.

In addition, when transmission mode (TM) of a near UE is different from TM of a far UE, another object of the present disclosure is to provide a method for informing a near UE of it.

The technical problems to be solved by the present invention are not limited to the technical problems mentioned above, and other technical problems which are not mentioned are clarified to those skilled in the art to which the present invention belongs from the description below.

Technical Solution

In one aspect of the present disclosure, a method for transmitting and receiving data using a non-orthogonal multiple access (NOMA) in a wireless communication system, the method performed by a first user equipment (UE) includes: receiving first downlink control information (DCI) including information related to physical downlink shared channel (PDSCH) scheduling of the first UE from a base station; receiving second DCI including information related to PDSCH cancellation of a second UE from the base station; receiving a superposition signal from the base station through a specific resource, wherein the superposition signal includes a PDSCH of the first UE and a PDSCH of the second UE; and decoding the PDSCH of the first UE by cancelling the PDSCH of the second UE from the superposition signal based on the received second DCI, wherein the first DCI and the second DCI are distinguished through at least one of a radio network temporary identifier (RNTI), a search space, or a specific indicator.

In addition, in the present disclosure, the first DCI may be CRC masked with a cell-RNTI (C-RNTI), and the second DCI may be CRC masked with an additional-RNTI (A-RNTI).

In addition, in the present disclosure, a length of the first DCI and a length of the second DCI may be configured to be the same, and a search space of the first DCI and a search space of the second DCI may be configured to be the same.

In addition, in the present disclosure, the length of the first DCI and the length of the second DCI may be configured to be the same by performing zero padding on DCI having a smaller payload size among a payload size of the first DCI or a payload size of the second DCI.

In addition, in the present disclosure, a parameter for determining a start of the search space of the second DCI may include the C-RNTI of the first DCI.

In addition, in the present disclosure, the search space of the second DCI may be a common search space.

In addition, in the present disclosure, the specific indicator may be an indicator indicating whether or not the second DCI is transmitted or an indicator indicating whether the first DCI is transmitted or the second DCI is transmitted.

In addition, in the present disclosure, the specific indicator may be included in at least one of the first DCI or the second DCI.

In addition, in the present disclosure, the method may further include receiving first control information indicating whether transmission mode (TM) of the second UE is the same as TM of the first UE from the base station.

In addition, in the present disclosure, the information related to the PDSCH cancellation of the second UE may be configured to include information differently depending on a receiver type.

In addition, in the present disclosure, the receiver type may be a symbol-level interference cancellation type or a codeword-level interference cancellation type.

In addition, in the present disclosure, the method may further include receiving second control information related to ON or OFF of data transmission and reception operation using the NOMA from the base station.

In addition, in the present disclosure, the second control information may be configured to a specific index of a modulation and coding scheme (MCS).

In addition, in the present disclosure, the first UE may be a near UE, the second UE may be a far UE, and the first UE may be better than the second UE in channel state with the base station.

In another aspect of the present disclosure, a first user equipment (UE) for transmitting and receiving data using a non-orthogonal multiple access (NOMA) in a wireless communication system, the first UE includes: a radio frequency (RF) unit for transmitting and receiving a wireless signal; and a processor functionally connected to the RF unit, wherein the processor is configured: to receive first downlink control information (DCI) including information related to physical downlink shared channel (PDSCH) scheduling of the first UE from a base station; to receive second DCI including information related to PDSCH cancellation of a second UE from the base station; to receive a superposition signal from the base station through a specific resource, wherein the superposition signal includes a PDSCH of the first UE and a PDSCH of the second UE; and to decode the PDSCH of the first UE by cancelling the PDSCH of the second UE from the superposition signal based on the received second DCI, wherein the first DCI and the second DCI are distinguished through at least one of a radio network temporary identifier (RNTI), a search space, or a specific indicator.

Advantageous Effects

The present disclosure has an effect that a near user equipment (UE) can correctly decode its signal by transmitting information related to signal cancellation of a far UE to the near UE in a multi-user superposition transmission (MUST) system.

In addition, the present disclosure has an effect that a near UE can correctly estimate a channel with a base station by informing the near UE of TM of a far UE.

The effects obtainable by the present invention are not limited to the above-mentioned effects, and other effects not mentioned can be clearly understood to those skilled in the art to which the present invention belongs from the description below.

DESCRIPTION OF DRAWINGS

The accompanying drawings, which are included herein as a part of a description in order to help understanding of the present invention, provide embodiments of the present invention, and describe the technical features of the present invention with the description below.

FIG. 1 illustrates an example of a network structure of an evolved universal terrestrial radio access network (E-UTRAN) to which the present invention can be applied.

FIG. 2 is a diagram for explaining physical channels used for the 3GPP LTE/LTE-A system to which the present invention can be applied and a general signal transmission method using the same.

FIG. 3 illustrates a structure of a wireless frame in a wireless communication system to which the present invention can be applied.

FIG. 4 shows an example of a resource grid for one downlink slot in a wireless communication system to which the present invention can be applied.

FIG. 5 shows a structure of a downlink subframe in a wireless communication system to which the present invention can be applied.

FIG. 6 shows a structure of an uplink subframe in a wireless communication system to which the present invention can be applied.

FIG. 7 is a conceptual diagram of an interference cancellation method used in a NOMA system to which the method proposed in the present disclosure can be applied.

FIG. 8 is a conceptual diagram illustrating an example of a downlink power control method.

FIG. 9 is a conceptual diagram showing an example of a hierarchical modulation.

FIG. 10 is a diagram showing an example of DCI format 0.

FIG. 11 shows an example of resource mapping of PDCCH.

FIG. 12 shows an example of distributing CCEs in a system band.

FIG. 13 is a diagram illustrating monitoring of PDCCH.

FIG. 14 is a flowchart illustrating an example of a method for operating a UE for transmitting and receiving data in an MUST system proposed in the present disclosure.

FIG. 15 illustrates a block diagram of a wireless communication apparatus to which the methods proposed in the present disclosure may be applied.

BEST MODE FOR INVENTION

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

General System

FIG. 1 illustrates a schematic structure a network structure of an evolved universal mobile telecommunication system (E-UTRAN) to which the present invention can be applied.

An E-UTRAN system is an evolved version of the UTRAN system. For example, the E-UTRAN may be also referred to as an LTE/LTE-A system. The E-UTRAN consists of eNBs, providing the E-UTRA user plane and control plane protocol terminations towards the UE. The eNBs are interconnected with each other by means of the X2 interface. The X2 user plane interface (X2-U) is defined between eNBs. The X2-U interface provides non guaranteed delivery of user plane packet data units (PDUs). The X2 control plane interface (X2-CP) is defined between two neighbour eNBs. The X2-CP performs following functions: context transfer between eNBs, control of user plane tunnels between source eNB and target eNB, transfer of handover related messages, uplink load management and the like. Each eNB is connected to User Equipments (UEs) through a radio interface and is connected to an Evolved Packet Core (EPC) through an S interface. The S1 user plane interface (S1-U) is defined between the eNB and the serving gateway (S-GW). The S1-U interface provides non guaranteed delivery of user plane PDUs between the eNB and the S-GW. The S1 control plane interface (S1-MME) is defined between the eNB and the MME (Mobility Management Entity). The S1 interface performs following functions: EPS (Enhanced Packet System) Bearer Service Management function, NAS (Non-Access Stratum) Signaling Transport function, Network Sharing Function, MME Load balancing Function and the like. The S1 interface supports a many-to-many relation between MMEs/S-GWs and eNBs.

FIG. 2 illustrates physical channels used for the 3GPP LTE/LTE-A system to which the present invention can be applied and a general signal transmission method using the physical channels.

A UE, which may have been powered on again from the power-off state or may have newly entered a cell, carries out the initial cell search task such as synchronizing itself with an eNB in the S201 step. To this purpose, the UE synchronizes with the eNB by receiving a primary synchronization channel (P-SCH) and a secondary synchronization channel (S-SCH) from the eNB and obtains information such as a cell ID (identifier).

Afterwards, the UE receives a physical broadcast channel (PBCH) signal from the eNB and obtains broadcast signal within the eNB. Meanwhile, the UE receives a downlink reference signal (DL RS) in the initial cell search step to check the downlink channel status.

The UE which has finished the initial cell search receives a PDSCH according to the PDCCH and PDCCH information in the S202 step to obtain more specific system information.

Next, the UE may carry out a random access procedure such as the steps of S203 to S206 to complete a connection process to the eNB. To this purpose, the UE transmits a preamble S203 through a physical random access channel (PRACH) and receives a response message in response to the preamble through a PDSCH corresponding to the PRACH S304. In the case of contention-based random access, the UE may carry out a contention resolution procedure including transmission of an additional PRACH signal S305 and reception of a PDCCH signal and the PDSCH signal corresponding to the PDCCH signal S206.

Afterwards, the UE which has carried out the procedure above may carry out reception S207 of the PDCCH signal and/or PDSCH signal and transmission S208 of a PUSCH signal and/or a PUCCH signal as a conventional uplink/downlink signal transmission procedure.

The control information that the UE transmits to the eNB is called collectively uplink control information (UCI). The UCI includes HARQ-ACK/NACK, a scheduling request (SR), a channel quality indicator (CQI), a precoding matrix indicator (PMI), and rank indication (RI) information.

In the LTE/LTE-A system, the UCI is transmitted periodically through the PUCCH; the UCI can be transmitted through the PUSCH if control information and traffic data have to be transmitted at the same time. Also, the UCI can be transmitted non-periodically through the PUSCH according to a request or a command from the network.

FIG. 3 is a diagram showing the structure of a radio frame used in a 3GPP LTE system to which the present invention can be applied.

In a cellular OFDM radio packet communication system, uplink/downlink data packet transmission is performed in subframe units and one subframe is defined as a predetermined duration including a plurality of OFDM symbols. The 3GPP LTE standard supports a type-1 radio frame structure applicable to frequency division duplex (FDD) and a type-2 radio frame structure applicable to time division duplex (TDD). According to the FDD scheme, the UL transmission and the DL transmission are performed by occupying different frequency bandwidths. According to the TDD scheme, the UL transmission and the DL transmission are performed on respective times different from each other while occupying the same frequency bandwidth. The channel response in the TDD scheme is substantially reciprocal. This signifies that the DL channel response and the UL channel response are about the same in a given frequency domain. Accordingly, there is a merit that the DL channel response can be obtained from the UL channel response in wireless communication systems based on the TDD. In the TDD scheme, since entire frequency bandwidth is timely divided in the UL transmission and the DL transmission, the DL transmission by an eNB and the UL transmission by a UE may not be performed simultaneously. In the TDD system in which the UL transmission and the DL transmission are distinguished by a unit of subframe, the UL transmission and the DL transmission are performed in different subframes.

FIG. 3(a) shows the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0.5 ms. One slot includes a plurality of OFDM symbols in a time domain and includes a plurality of resource blocks (RBs) in a frequency domain. In the 3GPP LTE system, since OFDMA is used in the downlink, an OFDM symbol indicates one symbol period. The OFDM symbol may be referred to as an SC-FDMA symbol or symbol period. A RB as a resource allocation unit may include a plurality of consecutive subcarriers in one slot.

The number of OFDM symbols included in one slot may be changed according to the configuration of cyclic prefix (CP). CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in case of the normal CP. In case of the extended CP, for example, the number of OFDM symbols included in one slot may be 6. In the case where a channel state is unstable, such as the case where a UE moves at a high speed, the extended CP may be used in order to further reduce inter-symbol interference.

In case of using the normal CP, since one slot includes seven OFDM symbols, one subframe includes 14 OFDM symbols. At this time, a maximum of three first OFDM symbols of each subframe may be allocated to a physical downlink control channel (PDCCH) and the remaining OFDM symbols may be allocated to a physical downlink shared channel (PDSCH).

FIG. 3(b) shows the structure of the type-2 radio frame. The type-2 radio frame includes two half frames and each half frame includes five subframes, a downlink pilot time slot (DwPTS), a guard period (GP) and an uplink pilot time slot (UpPTS). From among these, one subframe includes two slots. The DwPTS is used for initial cell search, synchronization or channel estimation of a UE. The UpPTS is used for channel estimation of a BS and uplink transmission synchronization of a UE. The GP is used to eliminate interference generated in the uplink due to multi-path latency of a downlink signal between the uplink and the downlink.

The structure of the radio frame is only exemplary and the number of subframes included in the radio frame, the number of slots included in the subframe, or the number of symbols included in the slot may be variously changed.

FIG. 4 shows an example of a resource grid for one downlink slot in the wireless communication system to which the present invention can be applied.

Referring to the FIG. 4, the downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block includes 12×7 resource elements. The resource element on the resource grid may be identified by an index pair (k, l) in the slot. Here, k (k=0, . . . , NRB×12−1) denotes an index of subcarrier in the frequency domain, and l (l=0, . . . , 6) denotes an index of symbol in the time domain. The number NDL of resource blocks included in the downlink slot depends on a downlink transmission bandwidth determined in a cell.

FIG. 5 shows a structure of a downlink subframe in the wireless communication system to which the present invention can be applied.

Referring to the FIG. 5, a maximum of three OFDM symbols located in a front portion of a first slot in a subframe correspond to a control region to be assigned with control channels. The remaining OFDM symbols correspond to a data region to be assigned with physical downlink shared channels (PDSCHs).

Examples of downlink control channels used in the 3GPP LTE include a physical control format indicator channel (PCFICH), a physical downlink control channel (PDCCH), a physical hybrid-ARQ indicator channel (PHICH), etc. The PCFICH transmitted in a 1st OFDM symbol of a subframe carries information regarding the number of OFDM symbols (i.e., a size of a control region) used for transmission of control channels in the subframe. Control information transmitted over the PDCCH is referred to as downlink control information (DCI). The DCI transmits uplink resource assignment information, downlink resource assignment information, an uplink transmit power control (TPC) command for any UE groups, etc. The PHICH carries an acknowledgement (ACK)/not-acknowledgement (NACK) signal for an uplink hybrid automatic repeat request (HARQ). That is, the ACK/NACK signal for uplink data transmitted by a UE is transmitted over the PHICH.

A BS determines a PDCCH format according to DCI to be transmitted to a UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC.

FIG. 6 shows a structure of an uplink subframe in the wireless communication system to which the present invention can be applied.

Referring to the FIG. 6, the uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. In case of being indicated from higher layer, UE can simultaneously transmit the PUCCH and the PUSCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Non-Orthogonal Multiple Access (NOMA) General

Non-orthogonal multiple access (NOMA) refers to a multiple access technique to obtain a larger bandwidth efficiency by reducing the previously considered inter-user interference through an interference cancellation receiver, further allocating a plurality of UEs to the same frequency-time resource with a previously considered power ratio, basically, compared with a method for allocating resources in the frequency-time domain in an existing OFDMA system under the premise of the interference cancellation receiver, The NOMA is a new radio access technology, and is considered as an important candidate technology for the next 5G system.

FIG. 7 is a conceptual diagram of an interference cancellation method used in a NOMA system to which the method proposed in the present disclosure can be applied.

As shown in FIG. 7, important constituent technologies of the NOMA system can be roughly divided into (1) a resource allocation method of a base station and (2) an interference cancellation method from a UE.

Here, the interference cancellation method of the UE may have a variety of forms such as 1) Symbol-level interference cancellation receivers, 2) ML (Maximum likelihood) receiver, 3) Symbol-level IC (Interference Cancellation) receivers, 4) CWIC (Codeword level interference Cancellation) receivers, 5) L-CWIC (MMSE based Linear CWIC), 6) ML-CWIC.

Depending on each interference cancellation technique, a reception gain of the UE varies in a given environment, and generally a case where the ML technique is applied and a gain of the CWIC type receiver are significantly increased in proportion to the UE implementation complexity.

Downlink Power Control

In a wireless communication system such as 3GPP LTE (-A), an energy per resource element (EPRE), which is an energy value for each resource element, is defined for power allocation of downlink resources.

At this time, a reference value is an EPRE for a cell-specific reference signal (CRE), and the CRS EPRE is determined as an higher layer signal to have a fixed value in a downlink system bandwidth and a subframe.

The EPRE for resources of a physical data shared channel (PDSCH) in which actual data is transmitted in the LTE (-A) system can be expressed as a certain ratio of the CRS EPRE.

For example, a ratio of the CRS EPRE to PDSCH EPRE is defined as $\rho_A$ in CRS-free orthogonal frequency division modulation (OFDM) symbol, and the ratio of CSR EPRE to PDSCH EPRE is defined as $\rho_B$ in the OFDM symbol in which CRS exists, FIG. 8 is a conceptual diagram illustrating an example of a downlink power control method.

In FIG. 8, a horizontal axis represents OFDM symbols, a vertical axis represents subcarriers, and a height represents power.

In FIG. 8, $\rho_A$ is determined by the power offset $\delta_{power\text{-}offset}$ depending on the application of a multi-user multiple input multiple output (MIMO) and the UE-specific variable $P_A$, $\rho_A/\rho_B$ is determined by the number of antenna ports and the cell-specific variable $P_B$.

In the current LTE system (i.e., Rel-10), $\rho_A$ is defined differently for two cases.

First, when transmitting PDSCH data using transmission diversity method by utilizing a four-cell common antenna port, $\rho_A$ is determined by Equation 1 below.

$$\rho_A = \delta_{power\text{-}offset} + P_A + 10 \log_{10} 2 \text{ [dB]}$$

【Equation 1】

Here, $\delta_{power\text{-}offset}$ denotes a power offset value for supporting the MU-MIMO operation, and is configured to 0 dB when other PDSCH is transmitted.

Also, $P_A$ means the UE specific variable as described above.

In other cases except for the transmission diversity based PDSCH transmission mentioned above, $\rho_A$ is defined as shown in Equation 2 below.

$$\rho_A = \delta_{power\text{-}offset} + P_A \text{ [dB]}$$

【Equation 2】

Hierarchical Modulation

FIG. 9 is a conceptual diagram showing an example of a hierarchical modulation.

Hierarchical Modulation (HM) will be briefly described with reference to FIG. 9.

The hierarchical modulation can be called or expressed as layered modulation.

The hierarchical modulation is one of techniques for multiplexing and modulating multiple data streams into one symbol stream.

Here, base-layer subsymbols and enhancement-layer subsymbols are superimposed in synchronization with each other before transmission.

When the hierarchical modulation is applied, a user or a user terminal having a good reception and an enhanced receiver can demodulate and decode more than one data stream.

In case of a user terminal having an existing receiver or a poor reception, it becomes possible to demodulate and decode only the data stream transmitted from a low layer (e.g., the base layer).

In an information-theory view, the hierarchical modulation has been dealt with as one practical implementation in superimposed precoding, and has been proposed to achieve a maximum sum rate of a Gaussian broadcast channel with successful interference cancellation at a receiving terminal (or receiver).

In a network operation view, when the hierarchical modulation is applied, a network operator can seamlessly target user terminals having different services or QoS.

However, in existing layer modulation, a rate achievable by low-layer data streams (e.g., the base layer data stream) is reduced by interference from the higher layer signal(s) due to inter-layer interference (ILI).

For example, for hierarchically modulated two-layer symbols including a 16QAM base layer and a QPSK enhancement layer, when a total received signal-to-noise ratio (SNR) is about 23 dB, a loss of base-layer throughput due to inter-layer interference may increase to about 1.5 bits/symbol.

This means that a loss of achievable throughput of base-layer means about 37.5% (1.5/4) at 23 dB SNR.

On the other hand, a demodulation error rate of either the base-layer or enhancement-layer symbols is also increased.

PDCCH (Physical Downlink Control Channel)

PDCCH includes resource allocation and transmission format of downlink shared channel (DL-SCH) (this is also referred to as downlink grant), resource allocation information of uplink shared channel (UL-SCH) (this is also referred to as uplink grant), paging information in a paging Channel (PCH), system information in the DL-SCH, a resource allocation for an upper-layer control message such as a random access response transmitted on the PDSCH, a set of transmission power control commands for individual UEs in a group of any UEs, and activation of voice over IP (VoIP).

FIG. 10 is a diagram showing an example of DCI format 0.

A plurality of PDCCHs may be transmitted in a control region, and a UE may monitor the plurality of PDCCHs. The PDCCH is composed of an aggregation of one or several consecutive control channel elements (CCEs).

The PDCCH composed of the aggregation of one or several consecutive CCEs may be transmitted through the control region after subblock interleaving. The CCE is a logical allocation unit used to provide the PDCCH with a coding rate depending on a state of a radio channel. The CCE corresponds to a plurality of resource element groups (REGs). A format of the PDCCH and the number of bits of a possible PDCCH are determined depending on a relationship between the number of CCEs and the coding rate provided by the CCEs.

PDCCH Structure

A plurality of multiplexed PDCCHs for a plurality of UEs can be transmitted in the control region. The PDCCH is composed of one or two or more consecutive CCE aggregation. The CCE is a unit corresponding to nine sets of REGs composed of four resource elements. Each REG is mapped to four quadrature phase shift keying (QPSK) symbols. Resource elements occupied by a reference signal (RS) are not included in the REG. That is, a total number of REGs in an OFDM symbol may vary depending on whether a cell specific reference signal is present or not. A concept of REG mapping the four resource elements to one group can be applied to other downlink control channels (e.g., PCFICH or PHICH). If REG not assigned to PCFICH or PHICH is $N_{REG}$, the number of CCEs available in the system is $N_{CCE} = \lfloor N_{REG}/9 \rfloor$, and each CCE has an index from 0 to $N_{CCE}-1$.

In order to simplify a decoding process of the UE, a PDCCH format including n CCEs can be started from a CCE having the same index as a multiple of n. That is, it can be started from a CCE satisfying a case where a CCE index is i (i mod n=0).

The base station can use {1, 2, 4, 8} CCEs to construct one PDCCH signal, and {1, 2, 4, 8} at this time is called a CCE aggregation level. The number of CCEs used for transmission of a specific PDCCH is determined by the base station depending on a channel state. For example, only one CCE may be sufficient for a PDCCH for a UE having a good downlink channel state (when it is close to the base station). On the other hand, in a case of a UE having a poor channel state (in a cell boundary), eight CCEs may be required for sufficient robustness. In addition, a power level of the PDCCH can also be adjusted to be matched to the channel state.

Table 1 shows the PDCCH format, and four PDCCH formats are supported as shown in Table 1 depending on the CCE aggregation level.

TABLE 1

| PDCCH format | Number of CCEs(n) | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

The reason why the CCE aggregation level is different for each UE is that a format of control information carried on the PDCCH or a modulation and coding scheme (MCS) level is different. The MCS level means a code rate and a modulation order used for data coding. An adaptive MCS level is used for link adaptation. In general, about 3 to 4 MCS levels can be considered in a control channel for transmitting the control information.

Describing the format of the control information, the control information transmitted through the PDCCH is referred to as downlink control information (DCI). Configurations of information carried in PDCCH payload may vary depending on a DCI format. The PDCCH payload means an information bit. Table 2 shows the DCI depending on the DCI format.

TABLE 2

| DCI Format | Description |
| --- | --- |
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |

Referring to Table 2, the DCI format includes a format 0 for PUSCH scheduling, a format 1 for scheduling of one PDSCH codeword, a format 1A for compact scheduling of one PDSCH codeword, a format 1C for very compact scheduling of DL-SCH, a format 2 for PDSCH scheduling in a closed-loop spatial multiplexing mode, a format 2A for PDSCH scheduling in an open loop spatial multiplexing mode, and formats 3 and 3A for transmission of a transmission power control (TPC) command for an uplink channel. The DCI format 1A can be used for PDSCH scheduling regardless of which transmission mode is configured to the UE.

A length of the PDCCH payload may vary depending on the DCI format. In addition, the type and the length of the PDCCH payload can be changed depending on whether it is a compact scheduling or a transmission mode configured to the UE.

The transmission mode may be configured so that the UE receives downlink data via the PDSCH.

For example, the downlink data via the PDSCH includes scheduled data for the UE, paging, a random access response, or broadcast information via BCCH. The downlink data via the PDSCH is related to the DCI format signaled through the PDCCH. The transmission mode may be semi-statically configured to the UE via upper layer signaling (e.g., radio resource control (RRC) signaling). The transmission mode can be classified into a single antenna transmission or a multi-antenna transmission. The transmission mode is semi-statically configured to the UE through upper layer signaling.

For example, the multi-antenna transmission includes transmit diversity, open-loop or closed-loop spatial multiplexing, multi-user-multiple input multiple output (MU-MIMO) or beamforming. The transmit diversity is a technique for increasing transmission reliability by transmitting the same data in multiple transmit antennas. The spatial multiplexing is a technique that is capable of transmitting high-speed data without increasing the bandwidth of the system by simultaneously transmitting different data in multiple transmit antennas. The beamforming is a technique that increases a signal to interference plus noise ratio (SINR) of a signal by applying a weight depending on channel states in multiple antennas.

The DCI format depends on the transmission mode configured to the UE. That is, the UE has a reference DCI format for monitoring depending on a transmission mode configured to itself. The transmission mode configured to the UE can have seven transmission modes as follows.

(1) Single-Antenna Port; Port 0
(2) Transmit Diversity
(3) Open-loop Spatial Multiplexing
(4) Closed-loop Spatial Multiplexing
(5) Multi-User MIMO
(6) Closed-Loop Rank=1 Precoding
(7) Single-Antenna Port; Port 5

PDCCH Transmission

The base station determines the PDCCH format depending on the DCI to be transmitted to the UE, and attaches a cyclic redundancy check (CRC) to the control information. The CRC is masked with a unique identifier (called a radio network temporary identifier (RNTI)) depending on an owner or use of the PDCCH. If the PDCCH is for a specific UE, the unique identifier of the UE, for example, a cell-RNTI (C-RNTI), may be masked in the CRC. If the PDCCH is for a paging message, a paging indication identifier, for example a paging-RNTI (P-RNTI), may be masked in the CRC. If the PDCCH is for system information, more specifically a system information block (SIB), a system information identifier, a system information RNTI (SI-RNTI) may be masked in the CRC. A random access-RNTI (RA-RNTI) may be masked in the CRC to indicate a random access response that is a response to transmission of UE's random access preamble.

Next, the base station performs channel coding on the control information to which the CRC is added to generate coded data. At this time, channel coding can be performed at a code rate depending on the MCS level. The base station performs rate matching depending on the CCE aggregation level allocated to the PDCCH format, and modulates the coded data to generate modulation symbols. At this time, a modulation sequence depending on the MCS level can be used. The modulation symbols constituting one PDCCH may be one of 1, 2, 4, and 8 of the CCE aggregation levels. Then, the base station maps the modulation symbols to physical resource elements (CCE to RE mapping).

Blind Decoding

A plurality of PDCCHs may be transmitted within one subframe. That is, a control region of one subframe is composed of a plurality of CCEs having indices 0 to $N_{CCE,k}-1$.

Here, $N_{CCE,k}$ denotes the total number of CCEs in a control region of a kth subframe. The UE monitors a plurality of PDCCHs in every subframe. Here, monitoring refers to the UE's attempting to decode each of the PDCCHs depending on the PDCCH format being monitored. In the control region allocated in the subframe, the base station does not provide information on where the corresponding PDCCH is located to the UE. Since the UE cannot know its PDCCH is transmitted from which location to which CCE aggregation level or DCI format in order to receive the control channel transmitted from the base station, the UE monitors an aggregation of PDCCH candidates in a subframe to find its PDCCH. This is referred to as blind decoding/detection (BD). After the UE de-masks its UE ID in the CRC field, the blind decoding refers to a method for examining a CRC error and checking whether the corresponding PDCCH is its own control channel.

In an active mode, the UE monitors the PDCCH of each subframe in order to receive data transmitted to the UE. In a DRX mode, the UE wakes up in a monitoring interval of every DRX cycle and monitors the PDCCH in a subframe corresponding to the monitoring interval. The subframe in which the PDCCH is monitored is referred to as a non-DRX subframe.

In order for the UE to receive the PDCCH to be transmitted to itself, the UE must perform blind decoding on all CCEs existing in the control region of the non-DRX subframe. Since the UE does not know which PDCCH format is to be transmitted, the UE must decode all of the PDCCHs at a possible CCE aggregation level until the blind decoding of the PDCCH in each non-DRX subframe succeeds. Since the UE does not know how many CCEs the PDCCH for itself uses, the UE must attempt detection at all possible CCE aggregation levels until the blind decoding of the PDCCH succeeds.

That is, the UE performs the blind decoding for each CCE aggregation level. That is, the UE first attempts decoding with the CCE aggregation level unit as 1. If the decoding is unsuccessful, the decoding is attempted with the CCE aggregation level unit as 2. After that, the decoding is attempted with the CCE aggregation level unit as 4 and the CCE aggregation level unit as 8. Also, the UE attempts the blind decoding on all four C-RNTI, P-RNTI, SI-RNTI and RA-RNTI. In addition, the UE attempts the blind decoding on all DCI formats to be monitored.

As described above, for all possible RNTIs, for all DCI formats that need to be monitored, if the UE attempts the blind decoding for every CCE aggregation level, since the number of detection attempts is excessively large, in the LTE system, a search space (SS) concept is defined for the blind decoding of the UE. The search space means a PDCCH candidate set for monitoring, and may have different sizes depending on each PDCCH format.

The search space may be composed of a common search space (CSS) and a UE-specific/dedicated search space (USS). In a case of the common search space, all the UEs can know a size of the common search space, but the UE-specific search space can be configured individually for each UE.

Therefore, the UE must monitor both the UE-specific search space and the common search space in order to decode the PDCCH, and thus perform a blind decoding (BD) at a maximum of 44 times in one subframe. This does not include blind decoding performed depending on different CRC values (e.g., C-RNTI, P-RNTI, SI-RNTI, RA-RNTI).

Due to a small search space, the base station may not be able to secure CCE resources for transmitting PDCCH to all UEs that intend to transmit PDCCH within a given subframe. This is because a CCE location is allocated and the remaining resources may not be included in the search space of the specific UE. A UE-specific hopping sequence may be applied at a start of the UE-specific search space to minimize such barriers that may continue in the next subframe.

Table 3 shows sizes of the common search space and the UE-specific search space.

TABLE 3

| PDCCH format | Number of CCEs(n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

In order to reduce a computational load of the UE depending on the number of attempts to perform the blind decoding, the UE does not simultaneously perform searches depending on all defined DCI formats. Specifically, the UE can always perform searches for DCI formats 0 and 1A in the UE-specific search space. At this time, the DCI formats 0 and 1A have the same size, but the UE can distinguish the DCI format using a flag for format 0/format 1A differentiation included in the PDCCH. In addition, depending on the PDSCH transmission mode configured by the base station, a different DCI format other than 0 and 1A can be requested to the UE. For example, there are DCI formats 1, 1B, and 2.

In the common search space, the UE can search DCI formats 1A and 1C. Also, the UE may be configured to search DCI format 3 or 3A, the DCI formats 3 and 3A have the same size as the DCI formats 0 and 1A, but the UE can distinguish the DCI format using a CRC scrambled by an identifier other than the UE-specific identifier.

Search space $S_k^{(L)}$ means a PDCCH candidate set depending on the aggregation level $L \in \{1, 2, 4, 8\}$. The CCE depending on the PDCCH candidate set m of the search space can be determined by the following Equation 3.

$$L \cdot \left\{ (Y_k + m) \bmod \left\lfloor \frac{N_{CCE,k}}{L} \right\rfloor \right\} + i \quad \text{[Equation 3]}$$

Here, $M^{(L)}$ represents the number of PDCCH candidates depending on the CCE aggregation level L for monitoring in the search space, and m=0, ..., $M^{(L)}$−1. i is an index for designating an individual CCE in each PDCCH candidates, i=0, ..., L−1.

As described above, the UE monitors both the UE-specific search space and the common search space in order to decode the PDCCH. Here, the common search space (CSS) supports PDCCHs having aggregation levels of {4, 8}, and the UE-specific search space (USS) supports PDCCHs having aggregation levels of {1, 2, 4, 8}.

Table 4 shows the PDCCH candidates monitored by the UE.

TABLE 4

| Type | Search Space $S_k^{(L)}$ | | Number of PDCCH candidates $M^{(L)}$ |
|---|---|---|---|
| | Aggregation level L | Size[in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Equation 3, in the case of the common search space, $Y_k$ is configured to 0 for two aggregation levels, L=4 and L=8. On the other hand, in the case of the UE-specific search space for the aggregation levels L, $Y_k$ is defined as shown in Equation 4.

$$Y_k = (A \cdot Y_{k-1}) \bmod D \quad \text{[Equation 4]}$$

Here, $Y_{-1} = n_{RNTI} \neq 0$, and RNTI value used for $n_{RNTI}$ may be defined as one of the identifiers of the UE. Also, A=39827, D=65537, and $k = \lfloor n_s/2 \rfloor$. Here, $n_s$ represents a slot number (or index) in the radio frame.

FIG. 11 shows an example of resource mapping of PDCCH.

Referring to FIG. 11, R0 denotes a reference signal of a first antenna, R1 denotes a reference signal of a second antenna, R2 denotes a reference signal of a third antenna, and R3 denotes a reference signal of a fourth antenna.

A control region in a subframe includes a plurality of control channel elements (CCEs). The CCE is a logical allocation unit used to provide the PDCCH with a coding rate depending on a state of a radio channel, and corresponds to a plurality of resource element groups (REGs). The REGs include a plurality of resource elements. The format of the PDCCH and the number of possible PDCCH bits are determined depending on a relationship between the number of CCEs and the coding rate provided by the CCEs.

One REG (represented by a quadruplet in the drawing) includes four REs, and one CCE includes nine REGs.

{1, 2, 4, 8} CCEs may be used to construct one PDCCH, and each element of {1, 2, 4, 8} is called a CCE aggregation level.

A control channel composed of one or more CCEs performs interleaving of REG units and is mapped to a physical resource after a cyclic shift based on a cell identifier (ID) is performed.

FIG. 12 shows an example of distributing CCEs in a system band.

Referring to FIG. 12, a plurality of logically continuous CCEs are input to an interleaver. The interleaver performs a function of scrambling a plurality of input CCEs in REG units.

Therefore, frequency/time resources constituting one CCE are physically distributed in an entire frequency/time region in the control region of the subframe. As a result, although the control channel is configured in CCE units, the interleaving is performed in REG units, thereby maximizing frequency diversity and interference randomization gain.

FIG. 13 is a diagram illustrating monitoring of PDCCH.

In 3GPP LTE, blind decoding is used for detecting PDCCH. The blind decoding is a method for checking whether a corresponding PDCCH is its own control channel or not by checking a CRC error by demasking a desired identifier in the CRC of a received PDCCH (called a PDCCH candidate). The UE does not know that its PDCCH is transmitted at which location within a control region using which CCE aggregation level or DCI format.

A plurality of PDCCHs can be transmitted in one subframe. The UE monitors the plurality of PDCCHs in every subframe.

Here, the monitoring means that the UE attempts a decoding of the PDCCH depending on the monitored PDCCH format.

In 3GPP LTE, a search space is used to reduce burden due to the blind decoding. The search space may be a monitoring set of the CCE for the PDCCH. The UE monitors the PDCCH within the corresponding search space.

Hereinafter, in a multi-user superposition transmission (MUST) system proposed in the present disclosure, a method in which a near UE (hereinafter, referred to as a 'near UE') provides information to the near UE to cancel a signal of the far UE (hereinafter, referred to as a 'far UE') will be described.

When the MUST system operates, it can be said that the near UE and the far UE have a pairing relationship.

As described above, in order to operate the MUST system in the LTE (-A) environment, at least two UEs are required.

The MUST system refers to a system based on the NOMA scheme mentioned above.

Also, in the MUST system, a UE having a relatively good channel state (e.g., channel SNR) with an eNB among two UEs is defined as a 'near UE', and a UE whose channel state with the eNB is relatively poor is defined as a far UE.

Therefore, the near UE is likely to relatively be close to the eNB, and the far UE is unlikely to relatively be close to the eNB.

Also, in order for the MUST system to operate, the near UE cancels a signal of the far UE from a received signal (i.e., a state in which the signal of the near UE and the signal of the far UE are superimposed) by demodulating or decoding the signal of the far UE to a symbol-level or codeword-level, and then can decode its (of near UE) signal.

At this time, in order for the near UE to know the signal of the far UE, the near UE needs to know the DCI transmitted for the far UE.

The DCI for the far UE can be informed to the near UE through various methods.

In the present disclosure, new DCI is defined as one of the above-mentioned methods, and a method for additionally transmitting the new DCI to the near UE is provided.

In this case, the near UE needs to distinguish two DCIs (DCI for near UE signal decoding and DCI for new DCI (DCI for far UE signal cancellation)) from each other.

Thus, the present disclosure provides a method for the near UE to distinguish the two DCIs.

Also, when the near UE has successfully received two different DCIs, if the transmission mode (TM) of the near UE and the TM of the far UE are the same, a channel between the eNB and each UE can be estimated using commonly a common reference signal (CRS) or a demodulation reference signal (DMRS).

However, when the TM of the near UE and the TM of the far UE are different, channel estimation between the eNB and each UE may be difficult.

Therefore, the present disclosure additionally provides a method for solving a problem that may occur when the TM of the near UE and the TM of the far UE are different.

First Embodiment: Method for Distinguishing Two DCIs in Near UE

First, in order for a near UE to cancel a signal of a far UE, a method for distinguishing two DCIs (DCI for decoding a signal of the near UE (e.g., PDSCH) and DCI for cancelling a signal of the far UE) received from a base station will be described.

The two DCIs may be represented by first DCI and second DCI.

At this time, the first DCI means DCI for decoding the signal of the near UE (e.g., PDSCH), and the second DCI means DCI for cancelling the signal of the far UE.

The first DCI means general DCI defined in the LTE(-A) system, and can be expressed as legacy DCI.

The second DCI may be expressed as assistant DCI (A-DCI) or the like.

The second DCI may be interpreted to mean new DCI transmitted by the base station to the near UE for MUST system operation.

That is, the eNB transmits existing DCI-n and the A-DCI-n to the near UE, and the near UE must distinguish the two DCIs (the existing DCI-n and the A-DCI-n).

Here, 'DCI-n' is a simplified representation of the DCI transmitted by the base station to the near UE.

Meanwhile, the far UE performs the same operation as the legacy UE receiving existing DCI-f from the eNB.

Here, 'DCI-f' is a simplified representation of the DCI transmitted by the base station to the far UE.

Thus, the base station transmits the legacy DCI-n (or the first DCI) having PDSCH scheduling information and control information of the near UE and the A-DCI-n (or the second DCI) having control information for cancelling the PDSCH (or signal) of the far UE to the near UE, and transmits the legacy DCI-f having the PDSCH scheduling information and control information of the far UE to the far UE.

Also, the eNB may transmit an assistant RNTI (A-RNTI) to the near UE that is capable of performing a MUST operation through RRC signaling as needed with C-RNTI.

At this time, the A-RNTI is configured to be different from the C-RNTI of the far UE and is configured to be different from the C-RNTI of the near UE.

The A-RNTI may be any C-RNTI that is not used by other UE that is near the near UE and far UE in a current cell.

Alternatively, the eNB does not signal the A-RNTI directly to the near UE, and can signal an offset value.

In this case, the UE may generate the A-RNTI by adding the offset received from the eNB to the C-RNTI.

Basically, as the search space and CRC masking of the DCI are performed on a C-RNTI basis, the near UE can perform the search space and CRC masking of the A-DCI-n using the A-RNTI.

Hereinafter, various methods for the Near UE to distinguish between (legacy or existing) DCI and A-DCI transmitted from the base station will be described in detail.

Method 1: A-RNTI Use

Method 1 is a method for distinguishing between (legacy or existing) DCI and A-DCI by defining an A-RNTI.

That is, the near UE can distinguish between DCI-n and A-DCI-n transmitted from the base station using different CRC masking seeds.

The base station configures lengths of the DCI-n and the A-DCI-n to be the same.

Then, the base station inserts (or includes) a C-RNTI of the near UE into a specific value or a specific variable that determines a start of the search space of the A-DCI-n to configure the search space of the A-DCI-n and the search space of the existing DCI-n to be the same.

When the eNB transmits the configured DCI-n and A-DCI-n to the near UE, the near UE may perform blind search of the same search space based on the C-RNTI when searching for two DCIs (DCI-n and A-DCI-n).

Thus, since the DCI-n and A-DCI-n have the same length and the same search space, the near UE can perform blind decoding on two DCIs with only one decoding.

That is, after decoding, the near UE can perform CRC check using C-RNTI and A-RNTI as a CRC masking seed, and distinguish whether it is the DCI-n or A-DCI-n through a radio network temporary identifier (RNTI) that succeeds in the CRC check.

Here, in order to make the lengths of the A-DCI-n and DCI-n (i.e., payload sizes) equal, the base station adjusts the length to the remaining DCI by performing zero padding on DCI having smaller payload size among the two DCI formats.

Method 2: DCI Distinguishing Indicator Use

Method 2 is a method for distinguishing between (legacy or existing) DCI and A-DCI using a DCI distinguishing indicator.

Specifically, Method 2 configures lengths of the existing DCI-n and A-DCI-n for the near UE to be the same, and configures CRC masking of the A-DCI-n to use C-RNTI of the near UE.

In addition, Method 2 also inserts the C-RNTI of the near UE into a variable that determines a start of the search space of the A-DCI-n to configure the search space of the A-DCI-n and the search space of the existing DCI-n to be the same.

Then, Method 2 adds an indicator field to distinguish the existing DCI-n and the A-DCI-n at the same location of the existing DCI-n and A-DCI-n.

A size of the indicator field may be 1 bit.

Here, if the indicator field indicates desired DCI-n (existing DCI-n), it can be configured to '0'. If the indicator field indicates assistant DCI-n (A-DCI-n), it can be configured to '1'.

Alternatively, conversely, if the indicator field indicates the desired DCI-n, it can be configured to '1'. If the indicator field indicates the assistant DCI-n, it can be configured to '0'.

Accordingly, the near UE can distinguish two different DCI-ns transmitted from the base station through the indicator field included in the existing DCI-n and the A-DCI-n, respectively, according to Method 2.

Method 3: Indicator that Indicates Whether to Transmit A-RNTI and A-DCI-n Use

Method 3 is a method for distinguishing between (legacy or existing) DCI and A-DCI using an indicator indicating whether A-RNTI and A-DCI-n are transmitted.

Specifically, Method 3 configures lengths of existing DCI-n and A-DCI-n for a near UE to be the same, and configures CRC masking of the A-DCI-n to use A-RNTI of the near UE.

Then, Method 3 inserts a C-RNTI of the near UE into a variable (or value) that determines a start of the search space of the A-DCI-n to configure the search space of the A-DCI-n and the search space of the existing DCI-n to be the same.

Method 3 adds an indicator field indicating whether 1-bit (or more bits) of A-DCI-n is transmitted to the existing DCI-n for the near UE.

If the indicator field indicating whether the A-DCI-n is transmitted is '0', it may indicate that the A-DCI-n is not transmitted. If the indicator field is '1', it may indicate that the A-DCI-n is transmitted. Alternatively, the value of the indicator field may be configured opposite to the above.

At this time, a location of the A-DCI-n may be configured to be immediately after the existing DCI-n in the search space, or to be located away from a predetermined value.

A relative resource location of the A-DCI-n based on the existing DCI-n may be signaled to the near UE by the base station or may be fixed in advance.

For example, it is assumed that the near UE makes a blind decoding (BD) attempt on a total of 10 CCE sets in the search space of the DCI-n, and detects the DCI-n in the BD attempt on a 5th CCE set.

At this time, if the indicator indicating whether the A-DCI-n included in the detected DCI-n is transmitted is configured to '1', the near UE performs BD on the A-DCI-n for a 6th CCE set that is the next CCE set.

At this time, the 1-bit (the indicator field indicating whether the A-DCI-n is transmitted) location added to the A-DCI-n may be configured to be fixed to '0' or '1', or may include other information.

Method 4: A-RNTI and Search Space (SS) Location Use

Method 4 is a method for distinguishing between (legacy or existing) DCI and A-DCI using locations of A-RNTI and a search space.

Specifically, Method 4 configures lengths of existing DCI-n format 0, 1A, or 1C and A-DCI-n to be the same, and configures CRC masking of the A-DCI-n to use the A-RNTI.

Method 4 may also configure the search space of the A-DCI-n to be the same as the common search space (DCI-n format 0, 1A, 1C available), or insert a C-RNTI of the near UE into a variable that determines a start of the search space of the A-DCI-n to configure the search space of the A-DCI-n and the search space of the existing DCI-n to be the same (DCI-n format 0, 1A, 1C available).

The eNB transmits the configured A-DCI-n together with the existing DCI-n to the near UE.

Then, since the near UE performs blind search for both the user specific search space and the common search space, when CRC check is performed using two different RNTIs (C-RNTI and A-RNTI) per blind search, the near UE can distinguish between the existing DCI-n and the A-DCI-n.

Second Embodiment: Method for Transmitting TM Information of Far UE

When transmission mode (TM) between the near UE and the far UE is different, a second embodiment provides a method for transmitting the TM information of the far UE to the near UE to solve a situation where the near UE cannot correctly cancel a signal of the far UE.

As described above, when the TM of the near UE and the TM of the far UE are the same, the channel of each UE can be estimated using a common CRS or DMRS, and can be precisely rate matched to a DMRS resource element (RE) location.

However, a problem may arise when the TM of the near UE and the TM of the far UE are different.

For example, when the base station performs CRS based transmission and DMRS based transmission to the far UE and the near UE, respectively, the near UE cannot perform accurate channel estimation, and incorrectly assumes that an interference PDSCH is rate-matched to the DMRS RE location.

Therefore, the base station informs the near UE that the data transmission of the far UE is performed based on the CRS.

In this case, the near UE performs cancellation on the assumption that the interference PDSCH exists in the DMRS RE location.

Alternatively, the base station punctures and transmits the data of the far UE to the DMRS RE location of the near UE.

Alternatively, the base station performs rate matching for the data of the far UE to the DMRS RE location of the near UE and does not map the data of the far UE to the location, and informs the far UE of this fact.

Thus, the far UE can perform rate matching for the DMRS RE location of the near UE.

As another example, it can be considered that the near UE is TM 4 and the far UE is TM 9.

In this case, the base station informs the near UE that the data transmission of the far UE is performed based on the DMRS.

Thus, the near UE performs cancellation on the assumption that the interference PDSCH is rate-matched to the DMRS RE location.

Alternatively, the base station performs rate matching for the data of the near UE to the DMRS RE location of the far UE, and does not map the data of the near UE to the location, and informs the near UE of the fact.

Thus, the near UE can perform rate matching for the DMRS RE location of the far UE.

That is, the second embodiment provides a method that the base station directly informs the near UE of the TM or a transmission scheme of the far UE.

More simply, in the second embodiment, the base station can inform the near UE only whether the RS used by the near UE for channel estimation in demodulation and the RS used by the far UE for channel estimation in demodulation are the same RS type or not.

For example, when the RS of the near UE is a CRS and the base station has signaled a specific bit (or a specific field) as '1', the near UE can know that the RS of the far UE is a different type of the RS of itself (for example, DMRS).

Also, when the specific bit is '0', the near UE can know that the RS of the far UE is the same type of the RS of itself (for example, CRS).

Here, the specific bit or the specific field is information indicating whether the RS of the far UE is the same type as the RS of the near UE.

Third Embodiment: Method for Transmitting Interference Information which is Configured Differently Depending on Receiver Type (Symbol Level Receiver, Codeword Level Receiver)

The third embodiment provides a method for transmitting interference information configured differently depending on two receiver types (for example, an SL-ML receiver and a CWIC receiver) to the near UE.

Table 5 below shows an example of the interference information transmitted to the near UE depending on the receiver type.

TABLE 5

| Candidates of NA information | SL-ML Receiver | CWIC Receiver |
|---|---|---|
| MCS (Mod order) | O | O |
| MCS (TBS) | X | O |
| Power (PA, PB, single alpha, multipe alphas) | O | O |
| MUST on/off (Power, dedicated field) | O | O |
| CRNTI(CW scrambling) | X | O |
| CRNTI(DCI SS) | X | O when overhearing CRNTI based DCI-f |
| CRNTI(DCI CRC) | X | O when overhearing CRNTI based DCI-f |
| Resource allocation | O (location of the interference RB in the scheduled RB) | O (correct value) |
| RV, NDI | X | O |
| Layer index | O | O |
| Demodulation RS | O/X | O |

In Table 5, an 'O' value indicates necessary information (or interference information transmitted to the near UE), and 'X' indicates that it is not necessary information.

The interference information described in Table 5, as an example, in addition to the interference information described in Table 1, and additionally necessary information can be transmitted to the near UE.

As described above, the interference information transmitted to the near UE may be delivered or transmitted to the near UE through the DCI by the base station, or may be delivered to the near UE through higher layer signaling (e.g., RRC signaling) by the base station.

The interference information may be transmitted to the near UE through A-DCI-n as described above.

Hereinafter, various methods for transmitting or delivering the interference information to the near UE will be described.

(Method 1)

Method 1 is a method for configuring for making a new modulation and coding scheme (MCS) table by reducing an MCS table (5 bits) used in existing (e.g., LTE) and using it for A-DCI-n.

For example, the far UE paired with the near UE for MUST may rarely use 64 QAM starting from index 17 of existing MCS table.

Therefore, Method 1 can make a new MCS table of 4 bits from index 1 (except index 0) to index 16 of the existing MCS table, and can inform the near UE of an MCS level of the far UE through the index of the new MCS table.

At this time, when the base station transmits new A-DCI-n to the near UE (when the length is not limited), or when the base station attaches interference information to DCI-n of the near UE and transmits it to the near UE, reducing the length of the MCS table as defined in Method 1 can help the near UE by reducing an amount of additional interference information transmitted to the near UE.

(Method 2)

Method 2 is a method for configuring for making a new MCS table including only transport block size (TBS) without a modulation order and using the new MCS table for A-DCI-n.

That is, the Method 2 is a method that the base station does not inform the near UE of the modulation order of the far UE paired with the near UE for the MUST, and informs the near UE of TBS information of the far UE using a new MCS table composed only of TBS (there is a high probability that the number of bits required is smaller than that of the existing MCS table).

Here, the near UE can find the modulation order of the far UE through a method such as blind decoding (BD).

(Method 3)

Method 3 is a method for making a new MCS table including a modulation order and TBS together with a power allocation factor, and configuring it to use for A-DCI-n.

For example, Method 3 can configure the power allocation factors differently for each modulation in an existing MCS table, or can configure the power allocation factors differently for each TBS, or can configure the power allocation factors differently after the modulation and the TBS are constant. Table 6 summarizes these as below.

TABLE 6

| MCS Index $I_{MCS}$ | Modulation Order $Q_m$ | TBS Index $I_{TBS}$ | Power Allocation factor $\alpha$ |
|---|---|---|---|
| 0 | 2 | 0 | 0.95 |
| 1 | 2 | 0 | 0.9 |
| 2 | 2 | 1 | 0.95 |
| 3 | 2 | 1 | 0.9 |
| 4 | 2 | 2 | 0.95 |
| 5 | 2 | 2 | 0.9 |
| 6 | 2 | 3 | 0.95 |
| 7 | 2 | 3 | 0.9 |
| 8 | 2 | 4 | 0.95 |
| 9 | 2 | 4 | 0.9 |
| 10 | 2 | 5 | 0.95 |
| 11 | 2 | 5 | 0.9 |
| 12 | 2 | 6 | 0.95 |
| 13 | 2 | 6 | 0.9 |
| 14 | 2 | 7 | 0.95 |
| 15 | 2 | 7 | 0.9 |
| 16 | 2 | 8 | 0.95 |
| 17 | 2 | 8 | 0.9 |
| 18 | 2 | 9 | 0.95 |
| 19 | 2 | 9 | 0.9 |
| 20 | 4 | 9 | 0.9 |
| 21 | 4 | 9 | 0.85 |
| 22 | 4 | 10 | 0.9 |
| 23 | 4 | 10 | 0.85 |
| 24 | 4 | 11 | 0.9 |
| 25 | 4 | 11 | 0.85 |
| 26 | 4 | 12 | 0.9 |

TABLE 6-continued

| MCS Index $I_{MCS}$ | Modulation Order $Q_m$ | TBS Index $I_{TBS}$ | Power Allocation factor $\alpha$ |
|---|---|---|---|
| 27 | 4 | 12 | 0.85 |
| 28 | 4 | 13 | 0.9 |
| 29 | 4 | 13 | 0.85 |
| 30 | 2 | | reserved |
| 31 | 4 | | |

As shown in Table 6, Method 3 shows that the power allocation factor is considered in addition to existing modulation order and TBS index.

Referring to Table 6, MCS index 0 and MCS index 1 have the same modulation order of 2 and TBS index has the same modulation order of 0, but the power allocation factor can be configured to be 0.95 and 0.9 differently.

Also, if the modulation order is 2 (MCS index 0-19), the power allocation factor is configured to be 0.95 or 0.9, and if the modulation order is 4 (MCS index 20-29), the power allocation factor is configured to be 0.9 or 0.85, so the power allocation factor can be configured differently for each modulation.

At this time, the power allocation factor $\alpha$ may be configured as a ratio allocated for the desired signal transmission of the far UE among the total transmission power from an eNB perspective. Table 6 above is configured accordingly.

Of course, when the power allocation factor is defined, it may be configured as a ratio allocated for the desired signal transmission of the near UE among the total transmission power from the eNB perspective.

In addition, the power allocation factor may be transmitted as the MCS table, but the power allocation factor may be transmitted through a new field of the DCI-n or a specific field of the A-DCI-n.

Also, instead of transmitting the power allocation factor to the near UE, power information of the near UE and power information of the far UE may be separately transmitted.

For example, the power information of the near UE and the power information of the far UE may be transmitted to the new field of the DCI-n, and the power information of the near UE and the power information of the far UE may be transmitted to a specific field of new A-DCI-n.

Also, the power information of the near UE may be transmitted to the new field of the DCI-n, and the power information of the far UE may be transmitted to the specific field of the A-DCI-n, respectively.

(Method 4)

Method 4 is a method for configuring on or off related signaling of the MUST operation using the MCS table transmitted through the A-DCI-n, which is the DCI for the signal cancellation of the far UE.

That is, Method 4 is a method that allows the near UE to know on or off of the MUST operation through the specific index of the MCS table included in A-DCI-n.

For example, in Method 4, the base station can inform the near UE that the MUST is disabled (or the MUST not operate or the operation of the MUST is turned off) using index 28, which is a highest MCS (except reserved) of the MCS table transmitted through the A-DCI-n.

This is a method that can be utilized or considered because the far UE paired with the near UE for the MUST have very little probability of using the highest MCS.

As another example, in Method 4, the base station can inform the near UE that the MUST is disabled using one of the reserved indexes (e.g., 29, 30, 31) of the MCS table transmitted through the A-DCI-n.

As other method, on or off related signaling for the MUST operation may utilize a specific CQI/MCS table.

That is, if the near UE is configured to use the specific CQI/MCS table, the near UE may know that the MUST is disabled.

For example, if the near UE is configured to use a 256QAM CQI/MCS table, the near UE knows that the MUST is disabled (or the MUST operation is turned off) through this.

(Method 5)

Method 5 is a method that when a near UE being MUST pairing uses a multi-layer (or multi-stream), (the base station) dynamically transmits the index of the layer including the interference of the far UE to the near UE using higher layer signaling (e.g., RRC signaling) or DCI.

For example, when the far UE interferes with layer 2 of two layers (layer 1, layer 2) used by the near UE, the base station can dynamically transmit the layer index 2 to the near UE using the higher layer signaling or the DCI.

Additionally, when the near UE operates on a DMRS basis (e.g., TM9), the base station can dynamically transmit the DMRS port index of the interference of the far UE to the near UE using the higher layer signaling or the DCI as described above.

Additionally, when the far UE uses a CWIC receiver, assuming that the PDSCH of the far UE is MUST pairing only when it is not a retransmission PDSCH, the interference information to be included in the A-DCI-n may be a MCS (modulation order, TBS), a power factor, a MUST on/off, a CRNTI, a resource allocation, a layer index, a demodulation RS, etc.

In case of the general PDSCH (including the retransmission PDSCH) mentioned in Table 5 described above, this is in contrast to additional transmission of NDI, RV, and so on.

On the other hand, when the far UE uses an SL-ML receiver, the interference information mentioned in Table 5 must be transmitted irrespective of whether the PDSCH of the far UE is retransmitted or not.

In addition to the method for distinguishing between the DCI-n and the A-DCI-n in the first embodiment, the MUST near UE can find desired interference information by overhearing the DCI-f directly, without using or receiving the A-DCI-n.

As described above, even in a method in which the near UE directly overhears the DCI-f, the concepts discussed above can be used to distinguish the DCI-n and the DCI-f.

In addition, although the interference information has been described as an example in the case where the A-DCI-n is used in the third embodiment, it goes without saying that the third embodiment can be applied to any signaling format (e.g., DCI-f) indicating interference information.

FIG. 14 is a flowchart illustrating an example of a method for operating a UE for transmitting and receiving data in an MUST system proposed in the present disclosure.

Here, the MUST system refers to a method for transmitting and receiving data using non-orthogonal multiple access (NOMA) described above.

Referring to FIG. 14, a first UE receives first downlink control information (DCI) including information related to physical downlink shared channel (PDSCH) scheduling of the first UE from a base station (S1410).

After that, the first UE receives second DCI including information related to PDSCH cancellation of a second UE from the base station (S1420).

The first UE is a near UE, the second UE is a far UE, and the first UE is better than the second UE in a channel state with the base station.

Also, the first DCI may be CRC masked with a cell-RNTI (C-RNTI), and the second DCI may be CRC masked with an additional-RNTI (A-RNTI).

Here, the base station may transmit the A-RNTI to the first UE through RRC signaling or the like.

Also, a length of the first DCI and a length of the second DCI are configured to be the same.

Specifically, the length of the first DCI and the length of the second DCI may be configured to be the same by performing zero padding on DCI having a smaller payload size among a payload size of the first DCI or a payload size of the second DCI.

In addition, the information related to the PDSCH cancellation of the second UE may be configured to include information differently depending on a receiver type.

The receiver type may be a symbol-level interference cancellation type or a codeword-level interference cancellation type.

Thereafter, the first UE receives a superposition signal from the base station through a specific resource (S 1430).

The superposition signal includes a PDSCH of the first UE and a PDSCH of the second UE.

Also, the specific resource means the same time and same frequency resources at which the PDSCH of the first UE and the PDSCH of the second UE are transmitted.

After, the first UE decodes a signal (e.g., PDSCH) of the first UE by cancelling the PDSCH of the second UE from the superposition signal based on the received second DCI (S1440).

Here, the first DCI and the second DCI may be distinguished through at least one of a radio network temporary identifier (RNTI), a search space, or a specific indicator.

A search space of the first DCI and a search space of the second DCI are configured to be the same.

In this case, a parameter for determining a start of the search space of the second DCI includes a C-RNTI of the first DCI.

Also, the search space of the second DCI may be a common search space.

That is, the first UE can obtain the second DCI by blind decoding through the common search space.

Further, the specific indicator may mean an indicator indicating whether or not the second DCI is transmitted or an indicator indicating whether the first DCI is transmitted or the second DCI is transmitted.

The specific indicator may be included in at least one of the first DCI or the second DCI.

In addition, the first UE receives first control information indicating whether transmission mode (TM) of the second UE is the same as TM of the first UE from the base station.

Accordingly, the first UE can know whether the PDSCH transmission to the second UE is CRS-based or DMRS-based, thereby performing accurate channel estimation.

In addition, the first UE may receive second control information related to ON or OFF of data transmission/reception operation (or MUST operation) using the NOMA from the base station.

In this case, the second control information may be configured as a specific index of a modulation and coding scheme (MCS) table (see Table 2).

General Devices to which the Present Invention can be Applied

FIG. 15 illustrates a block diagram of a wireless communication device according to an embodiment of the present invention.

Referring to FIG. 15, a wireless communication system includes a base station 1510 and a plurality of terminals 1520 located within a base station 1510 region. Here, the terminal 1520 may correspond to the UE, the node, the device, the RRH, the relay, the TP/RP, and the RSU.

The base station 1510 includes a processor 1511, a memory 1512, and a radio frequency unit 1513. The processor 1511 implements the functions, processes, and/or methods proposed in FIGS. 1-14 above. Layers of a radio interface protocol may be implemented by the processor 1511. The memory 1512 is connected to the processor 1511 to store various pieces of information for driving the processor 1511. The RF unit 1513 is connected to the processor 1511 to transmit and/or receive a wireless signal.

The terminal 1520 includes a processor 1521, a memory 1522, and an RF unit 1523. The processor 1521 implements the functions, processes and/or methods proposed in FIGS. 1-14 above. Layers of a radio interface protocol may be implemented by the processor 1521. The memory 1522 is connected to the processor 1521 to store various pieces of information for driving the processor 1521. The RF unit 1523 is connected to the processor 1521 to transmit and/or receive a wireless signal.

The memories 1512 and 1522 may be inside or outside the processors 1511 and 1521 and may be connected to the processors 1511 and 1521 in various well known ways. Also, the base station 1510 and/or the terminal 1520 may have a single antenna or multiple antennas.

In the aforementioned embodiments, the elements and characteristics of the present invention have been combined in specific forms. Each of the elements or characteristics may be considered to be optional unless otherwise described explicitly. Each of the elements or characteristics may be implemented in such a way as to be not combined with other elements or characteristics. Furthermore, some of the elements and/or the characteristics may be combined to form an embodiment of the present invention. The order of the operations described in connection with the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

An embodiment of the present invention may be implemented by various means, for example, hardware, firmware, software or a combination of them. In the case of implementations by hardware, an embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers and/or microprocessors.

In the case of an implementation by firmware or software, an embodiment of the present invention may be implemented in the form of a module, procedure, or function for performing the aforementioned functions or operations. Software code may be stored in memory and driven by a processor. The memory may be located inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

Although the method for transmitting and receiving data in the wireless communication system of the present invention has been described with reference to examples applied to the 3GPP LTE/LTE-A system, it is applicable to various wireless communication systems other than the 3GPP LTE/LTE-A system.

The invention claimed is:

1. A method for transmitting and receiving, by a first user equipment (UE), data using a non-orthogonal multiple access (NOMA) in a wireless communication system, the method comprising:
receiving, from a base station, first downlink control information (DCI) including information related to physical downlink shared channel (PDSCH) scheduling of the first UE;
receiving, from the base station, second DCI including information related to PDSCH cancellation of a second UE;
receiving, from the base station, a superposition signal including a PDSCH of the first UE and a PDSCH of the second UE; and
decoding the PDSCH of the first UE by cancelling the PDSCH of the second UE from the superposition signal based on the received second DCI,
wherein the first DCI and the second DCI are distinguished through a specific indicator, and
wherein each of the first DCI and the second DCI includes a field for the specific indicator.

2. The method of claim 1, further comprising:
receiving, from the base station, an offset value for determining an additional RNTI (A-RNTI),
wherein the first DCI is CRC masked with a cell-RNTI (C-RNTI), and the second DCI is CRC masked with an additional-RNTI (A-RNTI) which is determined based on the C-RNTI and the offset value.

3. The method of claim 1, wherein a length of the first DCI and a length of the second DCI are configured to be the same, and
a search space of the first DCI and a search space of the second DCI are configured to be the same.

4. The method of claim 3, wherein the length of the first DCI and the length of the second DCI are configured to be the same by performing zero padding on DCI having a smaller payload size among a payload size of the first DCI or a payload size of the second DCI.

5. The method of claim 3, wherein a parameter for determining a start of the search space of the second DCI includes a cell-RNTI (C-RNTI) of the first DCI.

6. The method of claim 3, wherein the search space of the second DCI is a common search space.

7. The method of claim 1, wherein a field for the specific indicator in the first DCI is configured to '0' for indicating the first DCI, and
wherein a field for the specific indicator in the second DCI is configured to '1' for indicating the second DCI.

8. The method of claim 1, further comprising:
receiving first control information indicating whether transmission mode (TM) of the second UE is the same as TM of the first UE from the base station.

9. The method of claim 8, wherein the information related to the PDSCH cancellation of the second UE is configured to include information differently depending on a receiver type.

10. The method of claim 9, wherein the receiver type is a symbol-level interference cancellation type or a codeword-level interference cancellation type.

11. The method of claim 1, further comprising:
receiving second control information related to ON or OFF of data transmission and reception operation using the NOMA from the base station.

12. The method of claim 11, wherein the second control information is configured to a specific index of a modulation and coding scheme (MCS).

13. The method of claim 1, wherein the first UE is a near UE, the second UE is a far UE, and the first UE is better than the second UE in channel state with the base station.

14. The method of claim 1,
wherein the first DCI is CRC masked with a cell-RNTI (C-RNTI), and the second DCI is CRC masked with the C-RNTI of the first DCI.

15. A first user equipment (UE) configured to transmit and receive data using a non-orthogonal multiple access (NOMA) in a wireless communication system, the first UE comprising:
a radio frequency (RF) unit; and
a processor functionally connected to the RF unit,
wherein the processor is configured:
to receive first downlink control information (DCI) including information related to physical downlink shared channel (PDSCH) scheduling of the first UE from a base station;
to receive second DCI including information related to PDSCH cancellation of a second UE from the base station;
to receive a superposition signal from the base station, wherein the superposition signal includes a PDSCH of the first UE and a PDSCH of the second UE; and
to decode the PDSCH of the first UE by cancelling the PDSCH of the second UE from the superposition signal based on the received second DCI,
wherein the first DCI and the second DCI are distinguished through a specific indicator, and
wherein each of the first DCI and the second DCI includes a field for the specific indicator.

* * * * *